United States Patent
Abur et al.

(10) Patent No.: US 11,176,289 B2
(45) Date of Patent: Nov. 16, 2021

(54) TECHNIQUES FOR PROCESSING POWER SYSTEM NETWORK INFORMATION

(71) Applicant: NORTHEASTERN UNIVERSITY, Boston, MA (US)

(72) Inventors: Ali Abur, Brookline, MA (US); Yuzhang Lin, Boston, MA (US)

(73) Assignee: Northeastern University, Boston, MA (US)

( * ) Notice: Subject to any disclaimer, the term of this patent is extended or adjusted under 35 U.S.C. 154(b) by 507 days.

(21) Appl. No.: 16/102,420

(22) Filed: Aug. 13, 2018

(65) Prior Publication Data
US 2019/0050511 A1 Feb. 14, 2019

Related U.S. Application Data

(60) Provisional application No. 62/544,102, filed on Aug. 11, 2017.

(51) Int. Cl.
*G06F 30/20* (2020.01)
*G06F 17/16* (2006.01)
*G06F 17/18* (2006.01)
*G06F 11/00* (2006.01)
*G01R 19/25* (2006.01)
*G06F 111/10* (2020.01)

(52) U.S. Cl.
CPC .............. *G06F 30/20* (2020.01); *G06F 11/00* (2013.01); *G06F 17/16* (2013.01); *G06F 17/18* (2013.01); *G01R 19/2513* (2013.01); *G06F 2111/10* (2020.01)

(58) Field of Classification Search
CPC .......... G06F 30/20; G06F 11/00; G06F 17/16; G06F 17/18; G06F 2111/10; G01R 19/2513
USPC ........................................................... 702/2
See application file for complete search history.

(56) References Cited

U.S. PATENT DOCUMENTS

2015/0094965 A1 * 4/2015 Schneider ................ H02H 6/00 702/58

OTHER PUBLICATIONS

Zhu_2006 (Enhanced State Estimators, Final Project Report, Power Systems Engineering Research Center PSERC Publication 06-45, Nov. 2006). (Year: 2006).*
Broussolle F. (1978). 'State estimation in power systems: detecting bad data through the sparse inverse matrix method', IEEE Trans. Power Apparatus and Systems, vol. PAS-97, No. 3, pp. 678-682.
Lin et al. (2015). 'Efficient Computation of Covariance Entries', Proc. North American Power Symposium.
Lin et al. (2017). 'Highly Efficient Implementation for Parameter Error Identification Method Exploiting Sparsity', IEEE Transactions on Power Systems, 32(1):734-742.

(Continued)

*Primary Examiner* — Brian S Cook
(74) *Attorney, Agent, or Firm* — Kacvinsky Daisak Bluni, PLLC

(57) ABSTRACT

Techniques and apparatus for parameter error detection in a power system based on state estimation are described. In one embodiment, for example, an efficient process may be used to derive and compute only the necessary subset of the gain matrix and covariance matrix, thus avoiding the computation and storage of large dense matrices. The described efficient process can be applied either to single-scan or multiple-scan schemes. Other embodiments are described.

18 Claims, 10 Drawing Sheets

(56) References Cited

OTHER PUBLICATIONS

Lin et al. (2018). A New Framework for Detection and Identification of Network Parameter Errors, "IEEE Transactions on Smart Grid," vol. 9(3).
Lin et al. (2018). 'Fast Correction of Network Parameter Errors', IEEE Transactions on Power Systems, vol. 33(1).
Takahashi et al. (1973). 'Formation of a sparse bus impedance matrix and its application to short circuit study', Proc. the PICA Conference, Minneapolis, MN, pp. 63-69.
Zhu et al. (2006). 'Identification of network parameter errors', IEEE Trans. Power Syst. 21(2):586-592.

\* cited by examiner

TECHNIQUES FOR PROCESSING POWER SYSTEM NETWORK INFORMATION

CROSS-REFERENCE TO RELATED APPLICATIONS

This application claims priority to U.S. Provisional Patent Application Ser. No. 62/544,102, filed on Aug. 11, 2017, entitled "Simultaneous Detection, Identification and Correction of Network Parameter and Measurement Errors in Electric Power Systems," the content of which is incorporated herein by reference.

STATEMENT OF GOVERNMENTAL SUPPORT

This invention was made with government support under Grant No. 1041877, awarded by the National Science Foundation. The Government has certain rights in the invention.

TECHNICAL FIELD

Embodiments herein generally relate to managing power system networks, and, more particularly, to processes for detecting and/or identifying network parameter errors.

BACKGROUND

Power system are continuously monitored to maintain operating conditions in a normal and secure state. Accuracy of network parameters is important for monitoring applications, such as state estimation (SE) applications. For instance, an SE solution may be biased due to errors in either analog measurements or the network model. Measurement errors can result from sensor biases and drifts, telecommunication failure and noise, and/or the like. Network model errors can result from inaccurate manufacturing data, incorrectly calculated line parameters, human data entry errors, changes in ambient conditions, and unreported changes in device parameter changes such as transformer taps, shunt capacitor banks, and/or the like. The presence of network parameter errors not only biases the SE solution, but may, for example, also lead to misidentification and incorrect removal of good measurements as bad data. Conventional SE systems. However, conventional SE systems typically assume perfect knowledge of the network models and do not have explicit capabilities to suspect and detect network parameter errors despite their common existence. For conventional SE systems that do attempt to determine parameter errors, such systems generally fail to distinguish between bad measurements and parameter errors and/or cannot scale to large utility power grids.

DETAILED DESCRIPTION

Figure 1:
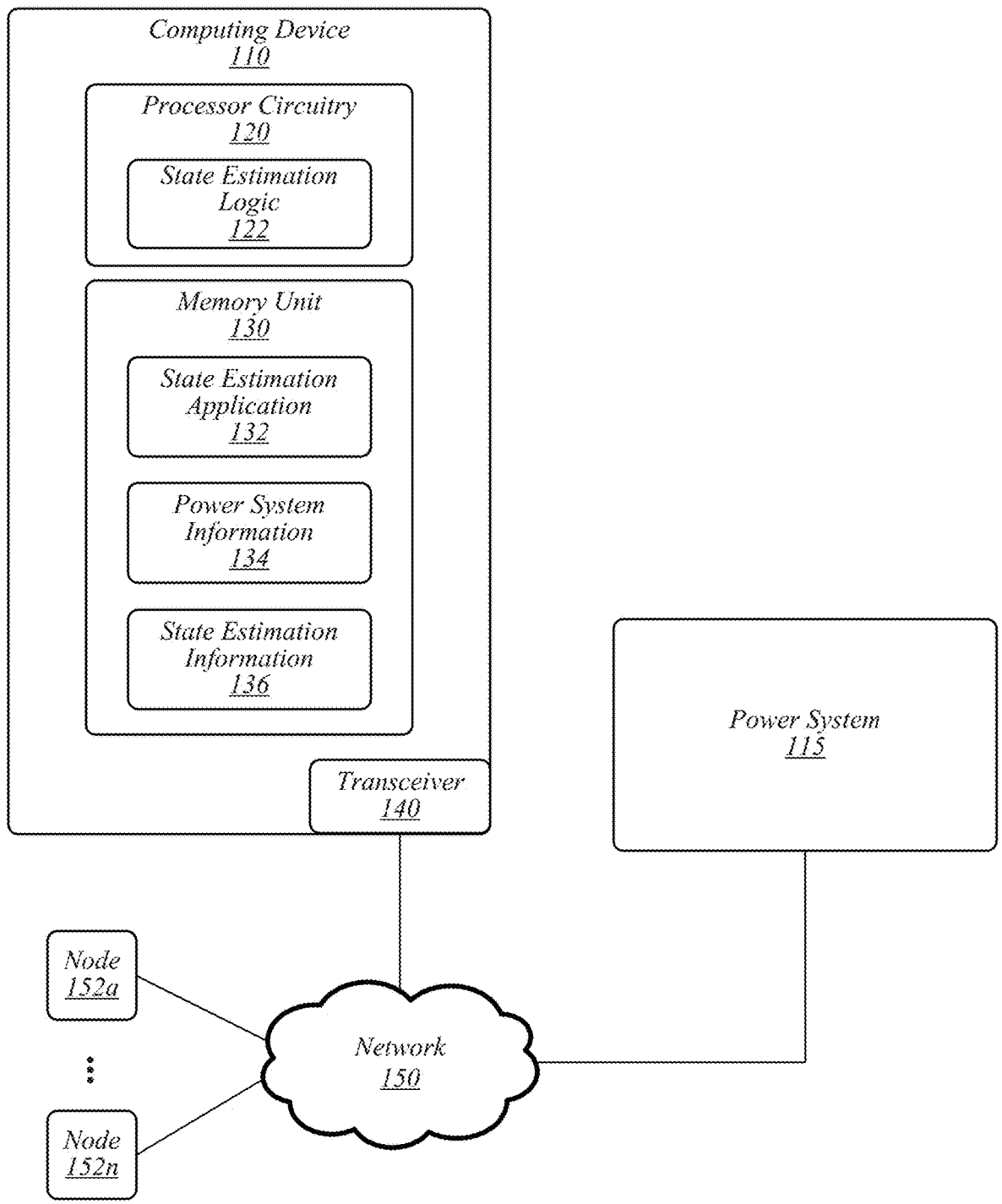
FIG. 1 illustrates an embodiment of a first operating environment.

Various embodiments may generally be directed toward systems, methods, and/or apparatus for managing information in a power system. A non-limiting example of a power system may include a utility power system, grid, portion thereof, components thereof, combinations of the foregoing, and/or the like. In particular, some embodiments may provide processes for determining, identifying, or otherwise processing parameter errors in a state estimation (SE) solution for a power system. In general, state estimation is a primary process for control centers, power markets, and other stakeholders to derive the state of a power system. For example, a state estimation platform may operate to identify the current operating state of a power system based on operational constraints on quantities such as transmission line loadings, bus voltage magnitudes, and/or the like. A state estimation solution may provide the state estimation for at least one scan of the power system. Embodiments are not limited in this context.

Accuracy of network parameters is very important for a majority of advanced applications in power system control centers. One of the functions which heavily rely on accurate parameter values is state estimation. In some embodiments, Lagrange multipliers may be used as a systematic way for identifying errors in network parameters. However, such an approach may require a rather heavy computational burden limiting its practical utilization to small size systems. Accordingly, some embodiments provide a computationally efficient process for identifying errors in network parameters. In various embodiments, only the necessary subset of the gain matrix and covariance matrix are derived and/or computed, thereby, among other things, avoiding the computation and storage of large dense matrices. State estimation processes according to exemplary embodiments may be applied to single-scan or multiple-scan schemes. State estimation processes according to some embodiments provide multiple technological advantages that include improvements to computing technology (for instance, computing technology operating SE processes), including, without limitation, improvements in computational speed and memory requirements for state estimation and/or parameter error detection systems.

State estimation applications may be biased due to errors in either analog measurements or the network model. Measurement errors can result from sensor biases and drifts, telecommunication failure and noise, and/or the like. Network model errors can result from inaccurate manufacturing data, incorrectly calculated line parameters, human data entry errors, changes in ambient conditions, and unreported changes in device parameter changes such as transformer taps, shunt capacitor banks, and/or the like. Large errors in analog measurements can be detected and identified with the help of residual-based statistical tests, while normal measurement noise can be filtered provided sufficient redundancy exists in the measurement set. In contrast, most of the conventional state estimation applications assume perfect knowledge of the network models and do not have explicit capabilities to suspect and detect network parameter errors despite their common existence.

Parameter errors may be identified by augmenting the state vector by a set of suspected parameters. This method works well as long as suspected parameter sets includes all bad parameters. It is however unrealistic to either determine the suspected set heuristically or inspect all parameters particularly for very large power grids. Other methods also exist, for example, such as those based on residual sensitivities, state augmentation, and/or the like. However, such approaches may be unable to differentiate between parameter and measurement errors and/or have prohibitively high computational burden when applied to large scale utility systems.

Certain conventional network parameter error detection processes may use Lagrange multipliers of network parameters. Such methods may have the following advantages: (1) only makes use of the state estimation solution, and does not require any modifications in the core state estimation software; (2) does not require selection of a suspect set of parameters in advance, and is capable of simultaneously inspecting all network parameters; (3) compatible with the well-known and commonly implemented largest normalized residuals method, which facilitates analysis of normalized Lagrange multipliers and normalized residuals and identification of parameter and measurement errors even when they occur simultaneously. However, such conventional Lagrange multipliers approaches may fail to distinguish between bad measurements and parameter errors under certain special cases that may be handled by incorporating multiple measurement scans according to some embodiments.

Despite the above described advantages of conventional Lagrange-based methods, its application to large utility power grids still presents a computational bottleneck, for example, when computing the covariance of the Lagrange multipliers for very large number of network parameters. Such computations may involve inversion of the gain matrix, which may be super sparse irrespective of the system size, yet its inverse is almost always completely full. Furthermore, to obtain the covariance, the inverse of the gain matrix may be multiplied by the two Jacobian matrices of the measurement function with respect to the states and the parameters. Their product may be a full matrix. These inversion and multiplication operations constitute the critical barriers of computational efficiency in this approach. The values of normalized Lagrange multipliers increase proportional to the square root of the number of measurement scans. Hence, to achieve a satisfactory improvement, many scans may be required, leading to a proportional increase in the computational burden.

Accordingly, some embodiments provide processes, for example, to overcome the inefficiencies in computing normalized Lagrange multipliers. In some embodiments, processes may exploit the sparse structure of the Jacobian matrices and/or processes may use a "sparse inverse" method to drastically reduce the computational burden, such as described in Y. Lin and A. Abur, "Efficient Computation of Covariance Entries", in Proc. North American Power Symposium (2015), which is incorporated by reference as if fully set forth herein. In some embodiments, sparse inverse techniques may be, among other things, extended to the full alternating current (AC) state estimation model and also for the multiple-scan scheme. State estimation processes (which may include parameter error detection processes) according to some embodiments provide multiple technological advantages that include improvements to computing technology (for instance, computing technology operating state estimation processes), including, without limitation, reducing the CPU time and memory by at least two orders of magnitude in power systems with thousands of buses, removing the computational bottleneck associated with conventional methods.

In addition to the previously identified weakness of conventional methods, processes according to some embodiments may operate to overcome additional issues of conventional systems, such as not being able to distinguish between shunt capacitance errors from reactive power injection errors mentioned, not being able to distinguish transformer tap errors from bus voltage errors with special local topology, and the problem of missing certain types of bad data in parameters.

Other non-limiting technological advantages may include using a state estimation solution without requiring modifications in the core state estimation software; not requiring selection of a suspect set of parameters in advance irrespective of the number of network parameters to be investigated; the ability to distinguish between the parameter and measurement errors without making any assumptions about the existence or lack of gross errors in measurements while detecting parameter errors; state estimation processes according to some embodiments may be executed as frequently as needed as an off-line application or can be executed each time the state estimator runs (for example, depending on operator preference, standard operating procedures, and/or the like).

State estimation processes according to some embodiments may be used according to various applications, including, without limitation, as a stand-alone network application in control centers by power grid operators to maintain a bias-free network model, by utilities to periodically clean their data bases from parameter errors, as a tool to obtain the parameters of re-wired or modified transmission lines without going through the detailed derivations using first principles. Embodiments are not limited in this context.

In various embodiments, state estimation processes may include one or more steps. In some embodiments, one step may include execution of a state estimation solution and obtaining the measurement residuals. A non-limiting example of a state estimation solution may include or may be implemented, at least in part, via a weighted least squares method. The measurement residuals may be used to obtain the Lagrange multipliers corresponding to one or more network parameters. In various embodiments, obtaining the Lagrange multipliers corresponding to one or more network parameters may be accomplished by, among other things, building the gradient of measurements with respect to the parameters and taking the product of this gradient, the measurement weight matrix, and the measurement residual vector. Both the Lagrange multipliers and the measurement residuals may then be normalized by using their respective covariance matrices. Since both of these normalized variables may have the same standard Normal distribution according to some embodiments, these values may be ranked with respect to their absolute magnitudes and the largest one may point to the bad measurement or parameter. In exemplary embodiments, a threshold, for instance, based on the desired confidence level (such as 99%), may be chosen to decide on the smallest normalized value for which to stop suspecting errors. In various embodiments, the process may be cyclic, for example, identifying one measurement or parameter error at a time and terminating when no more errors are suspected. In some embodiments, there may be proof of detection, for example, in a case of a single error, in multiple error cases where errors are not strongly correlated, and/or the like.

In this description, numerous specific details, such as component and system configurations, may be set forth in order to provide a more thorough understanding of the described embodiments. It will be appreciated, however, by one skilled in the art, that the described embodiments may be practiced without such specific details. Additionally, some well-known structures, elements, and other features have not been shown in detail, to avoid unnecessarily obscuring the described embodiments.

In the following description, references to "one embodiment," "an embodiment," "example embodiment," "various embodiments," etc., indicate that the embodiment(s) of the technology so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

FIG. 1 illustrates an example of an operating environment 100 that may be representative of some embodiments. As shown in FIG. 1, operating environment 100 may include a computing device 110 communicatively coupled to a power system 115, for example, via a network 150. In some embodiments, power system 115 may be or may include various systems, networks, or other structures, such as a transmission system, a distribution system, a generation system, and/or the like. In various embodiments, power system 115 may be or may include at least a portion of a power grid, public utility power system, industrial power system, and/or the like. In some embodiments, power system may 115 include power buses within an electrical grid, such as alternating current (AC) power busses. Embodiments are not limited in this context.

In various embodiments, operating environment 100 may include computing device 110 communicatively coupled to power system 115 and/or portions thereof or otherwise configured to receive and power system information 134 associated with power system 115. For example, power system 115 may operate to provide power system information 134 to a location on a network 150 (for instance, a cloud computing environment, a distributed computing environment, an energy management system (EMS), a supervisory control and data acquisition (SCADA) system, and/or the like) accessible to computing device 110. In some embodiments, computing device 110 may be operative to control, monitor, manage, or otherwise process various operational functions of power system 115. In some embodiments, computing device 110 may be or may include a stand-alone computing device, such as a personal computer (PC), server, tablet computing device, cloud computing device, SCADA device, and/or the like.

As shown in FIG. 1, computing device 110 may include processing circuitry 120, a memory unit 130, and a transceiver 140. Processing circuitry 120 may be communicatively coupled to memory unit 130 and/or transceiver 140.

Processing circuitry 120 may include and/or may access various logic for performing processes according to some embodiments. For instance, processing circuitry 120 may include and/or may access state estimation logic 122. Processing circuitry and/or state estimation logic 122, or portions thereof, may be implemented in hardware, software, or a combination thereof. As used in this application, the terms "logic, "component," "layer," "system," "circuitry," "decoder," "encoder," and/or "module" are intended to refer to a computer-related entity, either hardware, a combination of hardware and software, software, or software in execution, examples of which are provided by the exemplary computing architecture 900. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, combinations of any of the foregoing, and/or the like.

Although state estimation logic 122 is depicted in FIG. 1 as being within processing circuitry 120, embodiments are not so limited. For example, state estimation logic 122 may be located within an accelerator, a processor core, an interface, an individual processor die, implemented entirely as a software application (for instance, state estimation application 132) and/or the like.

Memory unit 130 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, memory unit 130 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

Memory unit 130 may store a state estimation application 132 that may operate, alone or in combination with state estimation logic 122, to perform various state estimation functions according to some embodiments. For example, state estimation application 132 access power system information 134 to generate estimation information 136 according to some embodiments. In some embodiments, power system information 134 may include any information associated with power system and/or operation thereof. For example, power system information 134 may include components of power system 115, such as buses, transformers, voltage sources, power consumers, capacitors, circuit breakers, switches, component locations, component taps, alternating current (AC) components, direct current (DC) components, and/or the like. In another example, power system information 134 may include power system 115 operations, such as voltages, line power flows, voltages (for instance, bus voltages), line current magnitudes, generator outputs, loads, circuit breaker information, switch status information, capacitor information (for instance, capacitor switch values), and/or the like. In some embodiments, at least a portion of power system information 134 may be obtained as electrical characteristics measured via measurement units arranged within power system 115.

In some embodiments, state estimation information 136 may include information associated with a state estimate of power system 115 (or portions thereof) generated by state estimation application 132. Non-limiting examples of state estimation information 136 may include topology information (for instance, a topology of power system 115 components, such as circuit breakers and switches, and status data thereof), observability information (for instance, whether a state estimation solution may be determined for power system 115 or portions thereof using available power system information 134, including identifying unobserved and/or unobservable branches), state estimation solutions (for instance, the optimal state of power system 115 or portions thereof, and best estimates for power system 115 functions, such as line flows, loads, transformer taps, generator outputs, and/or the like), bad data processing (for instance, gross errors in a measurement set), parameter error processing (estimates a plurality of network parameters and detects parameter errors, which may include structural errors). Non-limiting examples of network parameters may include transmission line model parameters, tap changing transformer parameters, shunt capacitor or reactor parameters, and/or the like. Embodiments are not limited in this context.

In various embodiments, state estimation application 132 (or a control application in communication with state estimation application 132) may be operative to control one or more portions of power system based on power system information 134 and/or state estimation information 136. For example, state estimation application 132 (or a control application in communication with state estimation application 132) may be operative to change, stop, or otherwise modify the operation of a component of power system (for instance, a bus) based on a detected parameter error. Embodiments are not limited in this context.

In some embodiments, state estimation application 132 may determine a state estimate solution and/or determine parameter errors and/or the impact of parameter errors. In some embodiments, for instance, to determine the impact of parameter errors, a measurement process may use the following equation (1):

$$z = h(x, p_e) + e,$$

where z is the measurement vector, x is the state vector, $p_e$ is the parameter error vector, e is the measurement error vector, and $h(x, p_e)$ is the nonlinear function relating x and $p_e$ to z.

In various embodiments, considering the parameter errors, a constrained Weighted Least Squares (WLS) state estimation determination may then be formulated according to the following equation (2):

$$\min J(x, p_e) = \frac{1}{2} r^T W r,$$
$$\text{s.t. } p_e = 0,$$

where W is the weighting matrix of the measurements (which may be the inverse of the diagonal matrix containing the variances of measurement errors, for instance, $W = R^{-1}$), $r = z - h(x, p_e)$ is the measurement residual vector. In various embodiments, it may be assumed, at least initially, that all parameter errors are zero, for example, by not suspecting/assuming any errors in the parameters. In such embodiments, equation (2) may reduce to a WLS state estimation determination.

The Lagrangian associated with the optimization problem of (2) may be given by the following equation (3):

$$L(x, p_e, \lambda) = \frac{1}{2} r^T W r - \lambda^T p_e$$

A network parameter vector may be denoted as $p = p_e + p_t$, where $p_t$ is the vector of true parameters. If $p_t$ is constant, derivatives with respect to p and $p_e$ may be equivalent. First order necessary conditions for the optimal solution of equation (2) can be written as the following equation (4):

$$\frac{\partial L}{\partial p} = H_p^T W r + \lambda = 0,$$

where $H_p$ is the measurement Jacobian with respect to the parameter vector p as well as $p_e$ according to the following equation (5):

$$H_p = \begin{bmatrix} \frac{\partial h_1(x, p_e)}{\partial p_1} & \cdots & \frac{\partial h_m(x, p_e)}{\partial p_1} \\ \vdots & \ddots & \vdots \\ \frac{\partial h_1(x, p_e)}{\partial p_u} & \cdots & \frac{\partial h_m(x, p_e)}{\partial p_u} \end{bmatrix},$$

where m is the number of the measurements and u is the number of the parameters. Using equation (4), the Lagrange multiplier vector may be determined according to the following equation (6):

$$\lambda = -H_p^T W r.$$

In some embodiments, $H_p$ and r may be computed at the state estimation solution.

In exemplary embodiments, Lagrange multipliers may be considered as indicators of the level of influence that corresponding constraints have on the objective function of the optimization problem. Hence, in the state estimation problem, large values of Lagrange multipliers may indicate those zero parameter error constraints which appear questionable. In order to meaningfully compare the significance of the computed Lagrange multipliers and analog measurement residuals, they may be normalized according to some embodiments. In various embodiments, the normalized Lagrange multipliers may have or may be expected to have a standard normal distribution. The covariance matrix of Lagrange multipliers may be given by the following equation (7):

$$\mathrm{cov}(\lambda) = E(\lambda\lambda^T) = E(H_p^T W r r^T W^T H_p) = H_p^T W \mathrm{cov}(r) W^T H_p,$$

where cov(r) is the covariance matrix of the measurement residual vector r.

In various embodiments, cov(r) may be evaluated according to the following equation (8):

$$\mathrm{cov}(\lambda) = SR = R - HG^{-1}H^T,$$

where H is the measurement Jacobian with respect to the states x of the following equation (9):

$$H = \begin{bmatrix} \frac{\partial h_1(x, p_e)}{\partial x_1} & \cdots & \frac{\partial h_m(x, p_e)}{\partial x_1} \\ \vdots & \ddots & \vdots \\ \frac{\partial h_1(x, p_e)}{\partial x_n} & \cdots & \frac{\partial h_m(x, p_e)}{\partial x_n} \end{bmatrix},$$

where n is the number of the states; $G = H^T W H$ is the gain matrix; and $S = I - HG^{-1}H^T R^{-1}$ is the sensitivity matrix linking measurement residuals to errors.

According to some embodiments, a covariance of Lagrange multipliers may be obtained via combining equations (7) and (8). Denoting the variance of Lagrange multipliers by $\Lambda = \mathrm{cov}(\lambda)$, normalized Lagrange multipliers may be given by the following equation (10):

$$\lambda_i^N = \frac{|\lambda_i|}{\sqrt{\Lambda(i, i)}}$$

In various embodiments, these values may be checked against a threshold (for instance, a "gross error" threshold) to identify gross errors in the corresponding parameters. In some embodiments, the gross error threshold may be 3.0. In various embodiments, the gross error threshold may be 0.5, 1.0, 1.5, 2.0, 2.5, 3.0, 3.5, 4.0, 4.5, 5.0, 10.0, and any value or range between any two of these values (including endpoints). Embodiments are not limited in this context.

In some embodiments, multiple measurement scans may be incorporated into state estimation processes. In various embodiments, permanent (as opposed to temporary) parameter errors may be assumed, which remain constant in several subsequent measurement scans, WLS state estimation problem can be extended to multiple measurement scans according to the following equation (11):

$$\min J(x, p_e) = \frac{1}{2} \sum_{q=1}^{s} r^{(q)T} W r^{(q)},$$
$$\text{s.t. } p_e = 0,$$

where s is the number of scans. In exemplary embodiments, the measurements and states of each scan may be independent from each other and, therefore, the solution to this problem may be the same as the combination of the solution to equation (1) of each scan.

Accordingly, the Lagrangian of equation (11) may then be given by the following equation (12):

$$L(x, p_e, \lambda) = \frac{1}{2} \sum_{q=1}^{s} r^{(q)T} W r^{(q)} - \lambda^T p_e.$$

Similarly, first order optimality conditions may be applied according to the following equation (13):

$$\frac{\partial L}{\partial p} = \sum_{q=1}^{s} H_p^{(q)T} W r^{(q)} + \lambda = 0.$$

Accordingly, the Lagrange multipliers associated with parameter errors may be obtained according to the following equation (14):

$$\lambda = -\sum_{q=1}^{s} H_p^{(q)T} W r^{(q)} = \sum_{q=1}^{s} \lambda^{(q)},$$

where $\lambda^{(q)}$ is the vector of Lagrange multipliers obtained by solving equation (1) and performing equation (6) using the qth scan only.

In various embodiments, the covariance of Lagrange multipliers can be expressed according to the following equation (15):

$$\mathrm{cov}(\lambda) = E(\lambda\lambda^T) = \sum_{q=1}^{s} \sum_{v=1}^{s} H_p^{(q)T} W E(r^{(q)} r^{(v)T}) W^T H_p^{(v)},$$

In various embodiments, measurements in different scans may be independent of each other, accordingly, the following equation (16):

$$E(r^{(q)} r^{(v)T}) = 0, q \neq v.$$

Accordingly, equation (15) may be reduced to the following equation (17):

$$\mathrm{cov}(\lambda) = E(\lambda\lambda^T)$$
$$= \sum_{q=1}^{s} H_p^{(q)T} W E(r^{(q)} r^{(q)T}) W^T H_p^{(q)}$$
$$= \sum_{q=1}^{s} H_p^{(q)T} W \mathrm{cov}(r^{(q)}) W^T H_p^{(q)}$$
$$= \sum_{q=1}^{s} \mathrm{cov}(\lambda^{(q)})$$

In various embodiments, state estimation processes may include determining normalized Lagrange multipliers. In exemplary embodiments, after the Lagrange multipliers and their variances are computed by equation (14) and equation (17) respectively, normalization may be performed by using equation (10).

In single-scan or multiple-scan scheme embodiments, the main computational effort for computing normalized Lagrange multipliers $\lambda_i^N$ may include the computation of the covariance matrix elements. In sum embodiments, $\Lambda^{(q)} = \mathrm{cov}(\lambda^{(q)})$ for the qth scan when using a multiple-scan embodiment. Substituting equation (8) into equation (7) with superscript (q) added to all matrices may provide the following equation (18):

$$\Lambda^{(q)} = H_p^{(q)T} W H_p^{(q)} - H_p^{(q)T} W H^{(q)} [G^{(q)}]^{-1} H^{(q)T} W^T H_p^{(q)T}.$$

In equation (18), the second term involves the computation of the inverse of the gain matrix, and the product of the inverse and the two Jacobian matrices. Both the matrix inversion and multiplication operations consume a significant amount of CPU time and memory. However, since only the diagonal entries of $\Lambda^{(q)}$ are actually needed, and $H_p^{(q)}$, $H^{(q)}$ and W are all super sparse, only a small subset of the entries in $[G^{(q)}]^{-1}$ (inverse gain matrix) are actually needed and used.

The structure of the necessary subset of $G^{-1}$ may be determined according to various embodiments. For example, the second term of equation (18) may be denoted without the negative sign as the following equations (19)-(21):

$$\Lambda^{(q)} = H_p^{(q)T} W H_p^{(q)} G^{(q)-1} H^{(q)T} W^T H_p^{(q)T}, \text{ and}$$

$$\Omega'^{(q)} = H^{(q)} G^{(q)-1} H^{(q)T}, \text{ such that}$$

$$\Lambda^{(q)} = H_p^{(q)T} W \Omega'^{(q)} W^T H_p^{(q)}.$$

With $\text{cov}(r^{(q)}) = W - \Omega'^{(q)}$, where $\Omega'^{(q)}$ is part of the covariance matrix of residuals. According to some embodiments, to obtain the necessary subset of $[G^{(q)}]^{-1}$, first the necessary subset of $\Omega'^{(q)}$ may be derived. If a system has n states, m measurements, and u parameters, using equation (19), the diagonal entries of $\Lambda'^{(q)}$ may be expressed as the following equation (22):

$$\Lambda'^{(q)}(i,i) = \Sigma_{k=1}^{u} \Sigma_{l=1}^{u} H_p^{(q)}(k,i) W(k,k) \Omega'^{(q)}(k,l) W(l,l) H_p^{(q)}(l,i).$$

Since $H_p^{(q)}$ is super sparse, only a few terms of the right-hand side sum are non-zero. Thus, in $\Omega'^{(q)}$, only the entries in the non-zero terms need to be computed. Accordingly, the necessary subset of $\Omega'$ can be written as the following equation (23):

$$\Omega'_{nec}{}^{(q)} = \{\Omega'_{nec}{}^{(q)}(k,l) | H_p^{(q)}(i,l) \neq 0; H_p^{(q)}(i,k) \neq 0; i=1,2,\ldots,u\}.$$

The required entries in $\Omega'^{(q)}$ for computing the variance of $\lambda_i$ are those corresponding to the covariance of measurements related to $\lambda_i$, for instance, the measurements in whose equations $p_i$ is present. For example, if there are $m_i$ measurement equations associated with $p_i$, then for computing the variance of $\lambda_i$, only $m_i \times m_i = m_i^2$ entries in $\Omega'^{(q)}$ need to be computed. Since only the local measurements are associated with a specific parameter, the number $m_i$ is typically small, so the number of necessary entries in $\Omega'^{(q)}$ is also small.

Similarly, the structure required subset of $[G^{(q)}]^{-1}$ entries can be found based on the structure of the necessary subset of $\Omega'^{(q)}$. Entries of $\Omega'^{(q)}$ can be expressed as the following equation (24):

$$\Omega'^{(q)}(i,j) = \sum_{k=1}^{m} \sum_{l=1}^{m} H^{(q)}(i,k) [G^{(q)}]^{-1}(k,l) H^{(q)}(j,l).$$

Because $H^{(q)}$ is super sparse, only a few terms of the right-hand side sum are non-zero. Thus in $[G^{(q)}]^{-1}$, only the entries in the non-zero terms need to be computed. Accordingly, the necessary subset of $[G^{(q)}]^{-1}$ may be written as the following equation (25):

$$([G^{(q)}]^{-1})_{nec} = \left\{[G^{(q)}]^{-1}(k,l) \middle| \begin{array}{l} H^{(q)}(i,l) \neq 0; H^{(q)}(j,k) \neq 0 \\ \Omega'^{(q)}(i,j) \in \Omega'^{(q)}_{nec} \end{array}\right\}.$$

In some embodiments, $[G^{(q)}]^{-1}$ is the covariance matrix of the states, $x^{(q)}$. The required entries in $[G^{(q)}]^{-1}$ for computing $\Omega'^{(q)}(i,j)$, for instance, the covariance of $r_i$ and $r_j$, are those entries corresponding to the covariance of states related to $r_i$ and $r_j$, for instance, the states which appear in the equations of $r_i$ and $r_j$. For example, if there are $n_i$ states associated with $r_i$, and $n_j$ states associated with $r_j$, then for computing $\Omega'^{(q)}(i,j)$, only $n_i \times n_j$ entries in $\Omega'^{(q)}$ need to be computed. Since only the local states are associated with a specific measurement, the number $n_i$ and $n_j$ are typically small, so the number of necessary entries in $[G^{(q)}]^{-1}$ is also small.

In various embodiments, the variances of Lagrange multipliers may rely only on local information, for instance, the covariance of neighboring states. Therefore, the number of necessary entries in $[G^{(q)}]^{-1}$ per parameter is independent of the system size. Accordingly, some embodiments may exploit this feature to achieve, inter alia, a drastic improvement in computational efficiency for state estimation processes.

After computing $([G^{(q)}]^{-1})_{nec}$, $\Lambda'^{(q)}(i,i)$ may be obtained by equations (22) and (24) in the reverse direction. Various embodiments may operate to determine $([G^{(q)}]^{-1})_{nec}$. An efficient process for determining a specific subset of entries in the inverse of a sparse matrix is presented in K. Takahashi, J. Fagan, and M.-S. Chin, "Formation of a sparse bus impedance matrix and its application to short circuit study". in *Proc. the PICA Conference*, Minneapolis, Minn., 1973, pp. 63-69 and F. Broussolle, "State estimation in power systems: detecting bad data through the sparse inverse matrix method," *IEEE Trans. Power Apparatus and Systems*, vol. PAS-97, no. 3, pp. 678-682, May/June 1978, both of which are incorporated by reference as if fully set forth herein. After minor modifications, these methods may be used to compute any desired subset.

In a fully observable system, the gain matrix of the qth scan, $G^{(q)}$, is symmetric, nonsingular, and positive definite. Applying Cholesky factorization it can be decomposed as the following equation (26):

$$G^{(q)} = L^{(q)} D^{(q)} L^{(q)T},$$

where $L^{(q)}$ is a unit lower triangular matrix, and $D^{(q)}$ is a diagonal matrix. In some embodiments, the following equation (27) may verify the following:

$$[G^{(q)}]^{-1} = D^{(q)-1} L^{(q)-1} + (I - L^{(q)T})[G^{(q)}]^{-1}.$$

On the right-hand side of equation (27), $D^{(q)-1} L^{(q)-1}$ is lower triangular, and $I - L(q)^T$ is strictly upper triangular. Therefore, $D^{(q)-1} L^{(q)-1}$ is irrelevant to the computation of the upper triangular entries of $[G^{(q)}]^{-1}$.

In some embodiments, the sparse inverse subset of $[G^{(q)}]^{-1}$ may be defined as the following equation (28):

$$([G^{(q)}]^{-1})_{sp} = \{[G^{(q)}]^{-1}(k,l) | Z^{(q)}(k,l) \neq 0; k,l = 1,2,\ldots,n\},$$

where $Z^{(q)} = L^{(q)} + D^{(q)} + L^{(q)T}$. In various embodiments, $([G^{(q)}]^{-1})_{sp}$ may be determined in terms of the non-zero entries of $L^{(q)}$ and other entries in $([G^{(q)}]^{-1})_{sp}$ according to the following equations (29)-(31):

$$[G^{(q)}]^{-1}(i,j) = -\sum_{k=i+1}^{n} L^{(q)}(k,i) [G^{(q)}]^{-1}(k,j) (i<j),$$

$$[G^{(q)}]^{-1}(i,i) = (D^{(q)}(i,i))^{-1} - \sum_{k=i+1}^{n} L^{(q)}(k,i) [G^{(q)}]^{-1}(k,i),$$

$$[G^{(q)}]^{-1}(i,j) = [G^{(q)}]^{-1}(j,i) (i>j).$$

Accordingly, the determination of the entries in $([G^{(q)}]^{-1})_{sp}$ is independent of the rest of $[G^{(q)}]^{-1}$. Starting from $[G^{(q)}]^{-}$ $i(n,n)$, all the entries in $([G^{(q)}]^{-1})_{sp}$ can be computed using equations (28), (29), and (30) iteratively.

In general, the subsets $([G^{(q)}]^{-1})_{nec}$ and $([G^{(q)}]^{-1})_{sp}$ are not equal, and there is no guarantee that entries of $([G^{(q)}]^{-1})_{nec}$ necessarily belong to $([G^{(q)}]^{-1})_{sp}$. However, all the nonzero entries in $G^{(q)}$ have locations corresponding to entries belonging to $([G^{(q)}]^{-1})_{sp}$. In other words, if $G^{(q)}(i,j) \neq 0$, then $[G^{(q)}]^{-1}(i,j) \in ([G^{(q)}]^{-1})_{sp}$. Hence, to let $([G^{(q)}]^{-1})_{nec} \subset ([G^{(q)}]^{-1})_{sp}$, let the entries in $G^{(q)}$ with locations corresponding to elements in $([G^{(q)}]^{-1})_{nec}$ be recorded as non-zeros (zeros in sparse matrices are generally not stored), while they may remain zero numerically. In this manner, all the entries of $([G^{(q)}]^{-1})_{nec}$ will belong to the expanded $([G^{(q)}]^{-1})_{sp}$ as determined by equations (28), (29), and (30).

In some embodiments, variances of Lagrange multipliers in each measurement scan may be used to compute the variances of Lagrange multipliers in multiple scans using equation (16). In various embodiments, subsequently, normalized Lagrange multipliers may be determined by equations (14) and (10).

Figure 2:
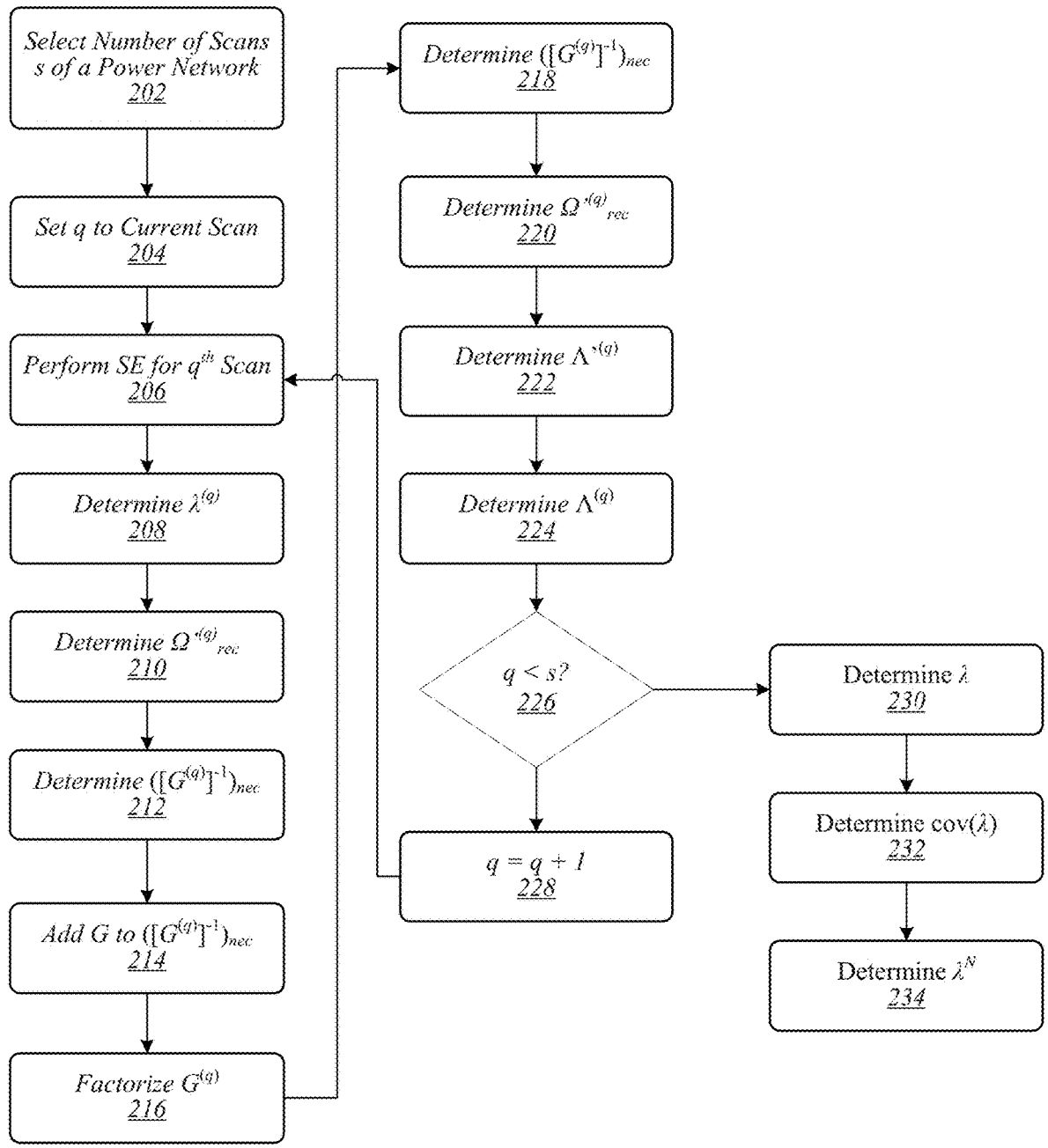
FIG. 2 illustrates an embodiment of a first logic flow.

FIG. 2 illustrates an embodiment of a logic flow 200. Logic flow 200 may be representative of some or all of the operations executed by one or more embodiments described herein, such as computing device 105. In some embodiments, logic flow 200 may be representative of some or all of the operations of determining normalized Lagrange multipliers in a multiple-scan scheme.

At block 202, logic flow 200 may select s measurement scans of a power network (for a single-scan scheme, s may be set to equal 1). At block 204, logic flow 200 may set q equal to the current scan (for example, q=1 for the first scan). Logic flow 200 may perform state estimation according to equation (1) of the qth scan at block 206. Logic flow 200 may compute $\lambda^{(q)}$ by equation (6) at block 208, determine the structure of $\Omega'^{(q)}_{rec}$ by equation (23) at block 210, and determine the structure of $([G^{(q)}]^{-1})_{nec}$ by equation (25) at block 212.

At block 214, logic flow may add the entries in G corresponding to the elements of $([G^{(q)}]^{-1})_{nec}$ as non-zeros. At block 216, logic flow 200 may factorize $G^{(q)}$ by equation (26). Logic flow 200 may determine the elements of $([G^{(q)}]^{-1})_{nec}$ by equations (29), (30), and (31) at block 218, determine the elements of $\Omega'^{(q)}_{rec}$ by equation (24) at block 220, determine the diagonals of $\Lambda'^{(q)}$ by equation (22) at block 222, and determine the diagonals of $\Lambda^{(q)}$ by equation (18) at block 224.

At block 226, logic flow 200 may determine whether q<s. If q<s, then logic flow 200 may set q=q-1 at block 228 and proceed to block 206. If q>s, then logic flow 200 may determine $\lambda$ by equation (14) at block 230, determine cov($\lambda$) by equation (17) at block 232, and determine $\lambda^N$ by equation (10) at block 234.

Case Studies I-IV

A large utility power system containing more than 14,000 buses was used as a test system. The measurement set included all bus injections and voltages magnitudes, and all branch flows from one end. Accordingly, full measurement redundancy was assumed. Network parameters of all types were evaluated, including, without limitation, branch resistances and reactances, transformer taps, and shunt capacitances. To simplify the notation, all superscripts are omitted in presenting the results of the single-scan scheme. Variables r, x, t, s, p, q, and v are used to refer to series resistance, reactance, transformer tap, shunt susceptance, real and reactive power, and voltage magnitude measurements, respectively.

Case Study I: Computational Efficiency.

As evident from equations (14) and (17), in the multiple-scan scheme computations of covariance in each scan are actually decoupled and can be computed separately. As a result, the computational time and the number of scans have a simple linear relationship. Therefore, case studies are focused on determining the cost of covariance matrix computation for a single scan, since the computational cost of multiple-scan schemes can be readily evaluated based on single scan results.

Two stages of obtaining the variances of Lagrange multipliers were evaluated in the Case Study I: the stage of obtaining $(G^{-1})_{nec}$ (or $([G^{(q)}]^{-1})_{nec}$) and the stage of computing the variances of Lagrange multipliers with known $(G^{-1})_{nec}$. In order to investigate the dependence of computational cost on system size, different size subsystems derived from the original test system were selected and tested. The computation platform for the case study was a PC with 4-core 2.5 GHz CPU and 16 GB RAM.

Figure 3:
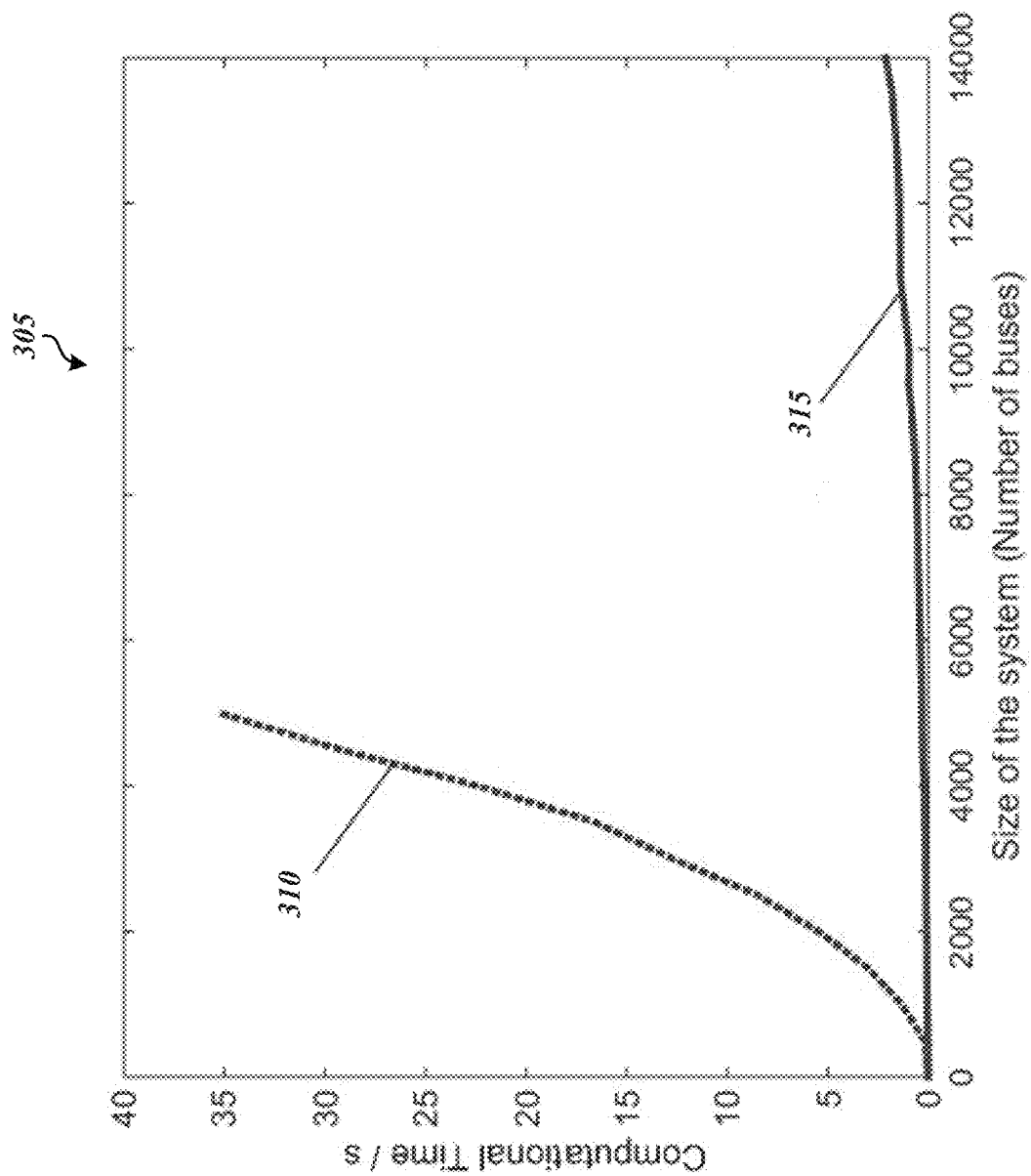
FIG. 3 illustrates a graph of computational time versus system size for a case study according to some embodiments.
Figure 4:
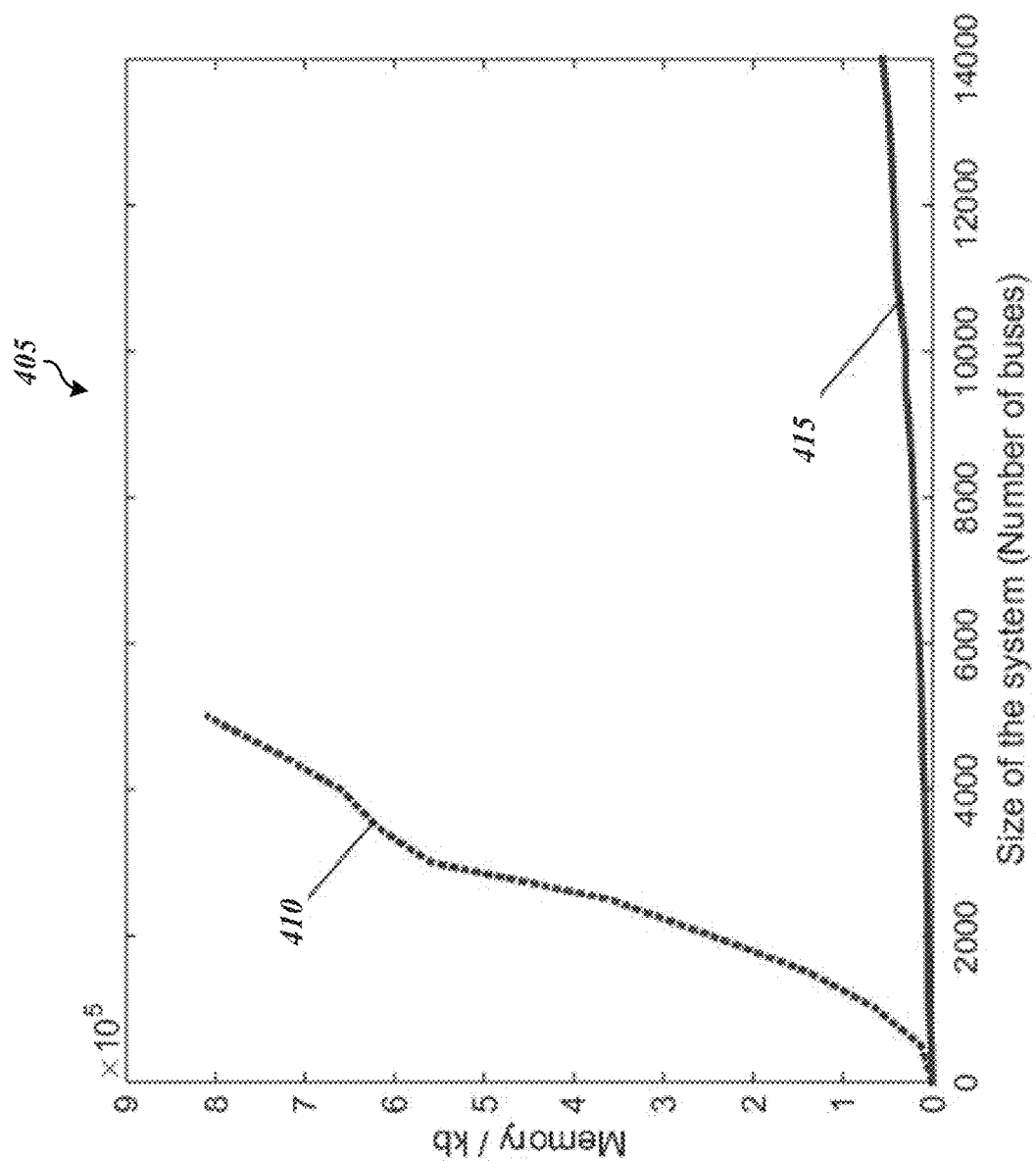
FIG. 4 illustrates a graph of memory versus system size for a case study according to some embodiments.

With respect to determining $(G^{-1})_{nec}$, the computational (or CPU) time and memory consumed by computing $(G^{-1})_{nec}$ versus full $G^{-1}$ are illustrated in FIGS. 3 and 4, respectively. Referring to FIG. 3, therein is depicted a graph 305 showing CPU time versus system size (for instance, number of buses) for a conventional method (for instance, full computation) 310 and a process according to some embodiments 315. Referring to FIG. 4, therein is depicted a graph 405 showing memory requirements versus system size for a conventional method (for instance, full computation) 410 and a process according to some embodiments 415.

For a system size below 500 buses, the difference between processes according to some embodiments and conventional processes (for instance, full computation) is relatively small. When the system size increases however, the difference becomes significant. The fast increase of CPU time and memory makes the full computation very expensive, while the costs of the processes according to some embodiments remains modest. When the system size is 5,000 buses, a common size for many utility systems, the CPU time and memory of full computation are 35.2 s and 98.7 MB, while those processes according to some embodiments are 0.321s and 1.41 MB, 0.9% and 1.4% of the conventional method, respectively. For the entire 14K-bus system, the CPU time and memory of full computation are 642 s and 1530 MB, while those of processes according to some embodiments are 2.13 s and 6.7 MB, 0.3% and 0.4% of the conventional method. Accordingly, processes according to some embodiments may reduce resource requirements, such as CPU time and memory requirements, when compared with conventional methods. For large power systems, the costs are reduced roughly by two orders of magnitude. Accordingly, the larger the system size, the more significant the resource savings that may be achieved.

Case Study II: Computing the Variances with Known $(G^{-1})_{nec}$.

Figure 5:
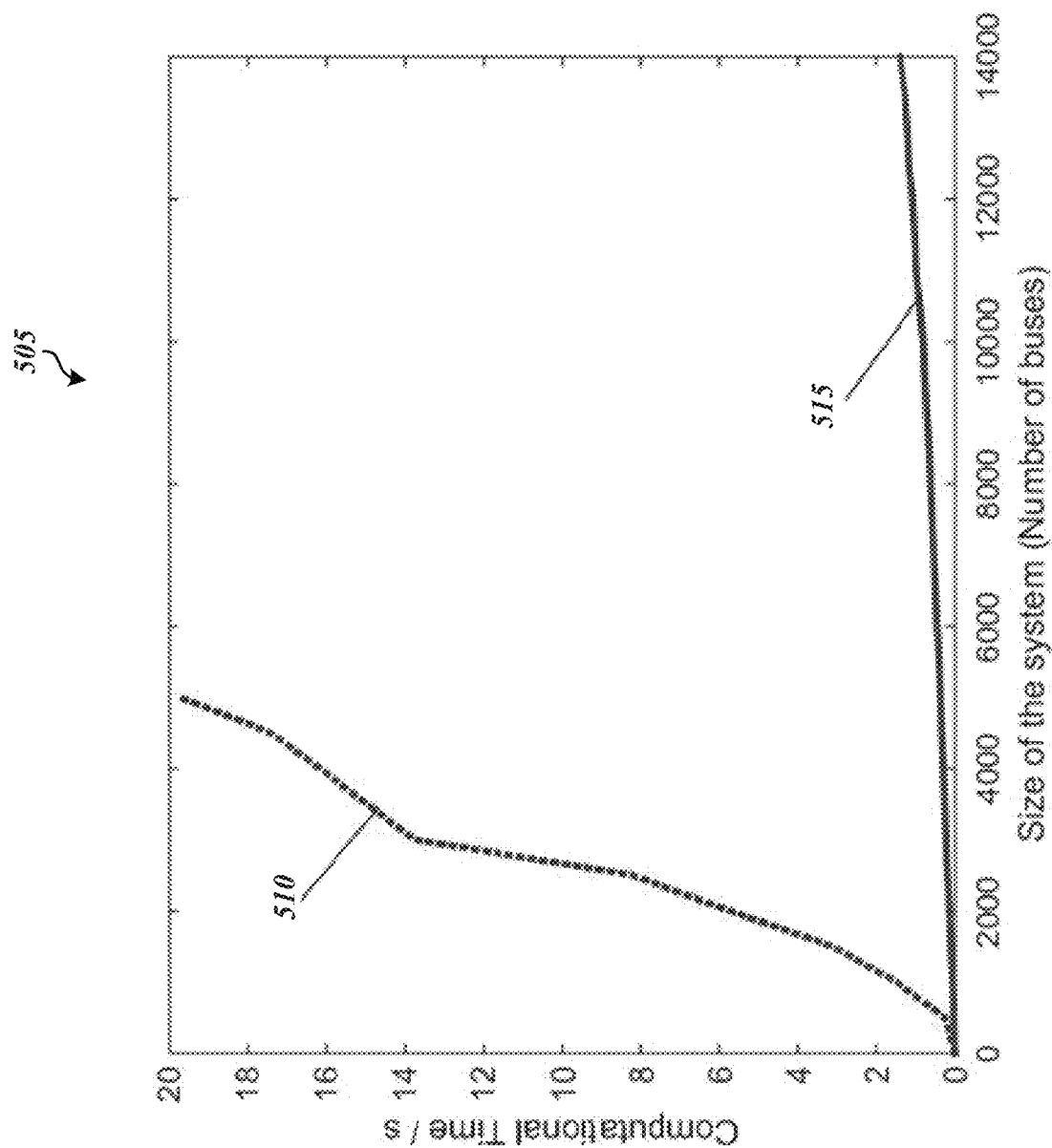
FIG. 5 illustrates a graph of computational time versus system size for a case study according to some embodiments.
Figure 6:
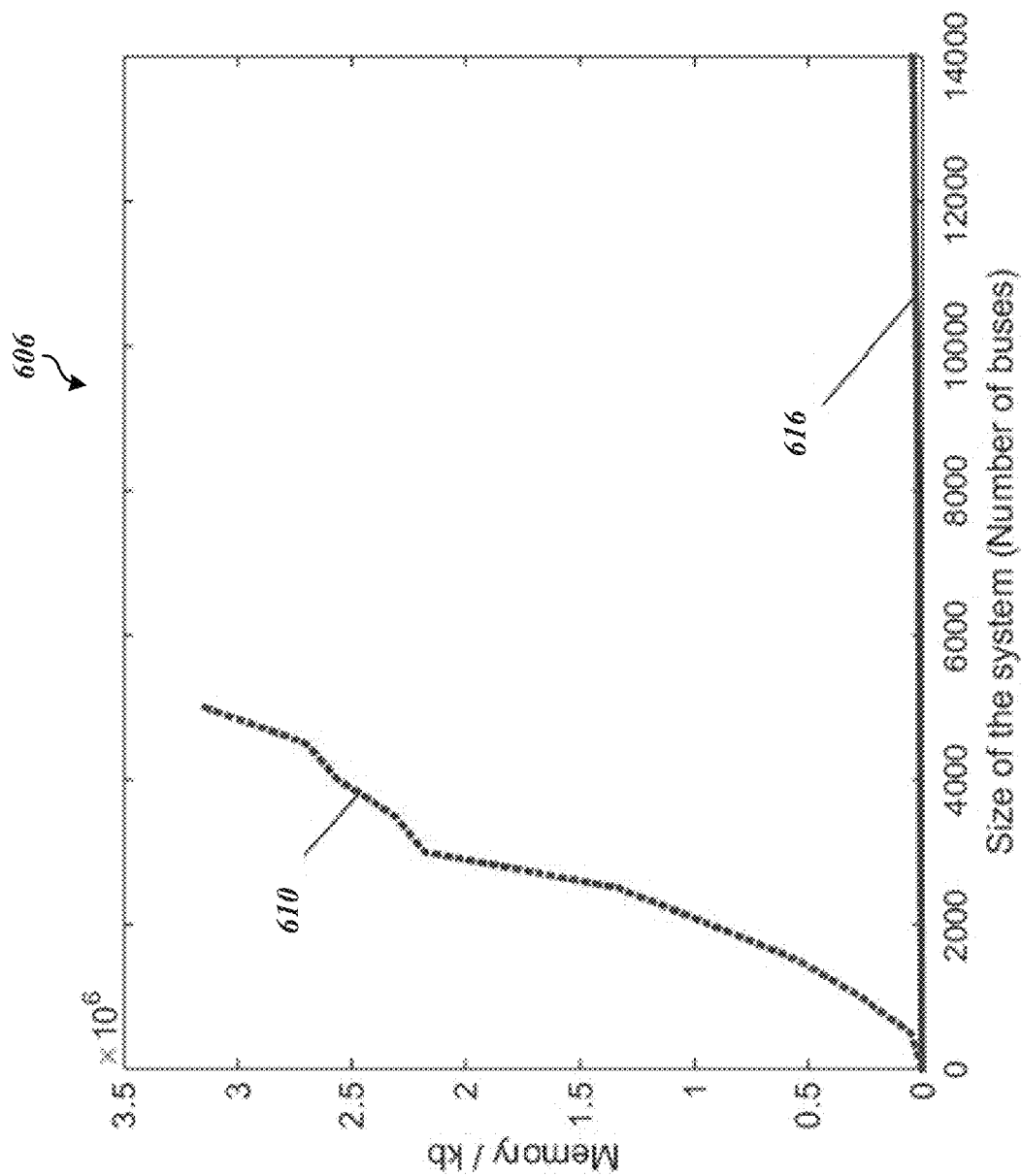
FIG. 6 illustrates a graph of memory versus system size for a case study according to some embodiments.

The CPU time and memory required by computing only the necessary entries of the covariance A with given $(G^{-1})_{nec}$, and the full covariance with given $G^{-1}$, are illustrated in FIGS. 5 and 6, respectively. Referring to FIG. 5, therein is depicted a graph 505 showing CPU time versus system size (for instance, number of buses) for a conventional method (for instance, full computation) 510 and a process according to some embodiments 515. Referring to FIG. 6, therein is depicted a graph 605 showing memory requirements versus system size for a conventional method (for instance, full computation) 610 and a process according to some embodiments 615.

As depicted in FIG. 6, obtaining matrix products uses less CPU time but more memory than the inversion. The large memory requirement is due to the larger dimension of $\Omega'$ and $\Lambda$ than $G^{-1}$. For example, for the 14K-bus test system, the number of states, measurements and parameters are 28285, 78381, and 40697 respectively. Corresponding memory required for storing $\Omega'$ and $\Lambda$ are approximately 7.78 and 2.01 times of that required for storing $G^{-1}$.

Despite the difference, the growing trends of the costs in this stage are similar to those in the first stage. The fast increase of costs for full computation makes it expensive and even infeasible in large systems. Considering 5,000 buses, the CPU time and memory of full computation will be 19.7s and 384 MB, compared to 0.369s and 1.35 MB of processes according to some embodiments, 1.9% and 0.4% of conventional methods, respectively. Full computation cannot be carried out for the 14K-bus system using the existing computation platform due to lack of memory. By contrast, the CPU time and memory required by processes according to some embodiments is still low: 1.35s and 5.01 MB, respectively. From the test results it can be seen that in both computation stages, the required memory of the proposed algorithm is sufficiently low even for a standard off-the-shelf PC, and the CPU time is sufficiently short even for online applications.

Case Study III: Identification of Transformer Tap Errors

In the 14K-bus system, certain transformer tap errors cannot be distinguished from voltage magnitude errors in certain special cases using conventional methods. As an example, two errors are introduced in $t_{(7262-7259)}$ and $v_{(7259)}$ in two separate scenarios, and the results are tabulated in the TABLE 1.

TABLE 1

| | Errors | | |
|---|---|---|---|
| $t_{(7262-7259)}$ | | $v_{(7259)}$ | |
| z/p | $r^N/\lambda^N$ | z/p | $r^N/\lambda^N$ |
| $t_{(7262-7259)}$ | 20.68 | $v_{(7259)}$ | 23.81 |
| $v_{(7259)}$ | 20.68 | $t_{(7262-7259)}$ | 23.81 |
| $r_{(7262-7259)}$ | 20.58 | $r_{(7262-7259)}$ | 23.74 |
| $q_{(7262-7259)}$ | 6.955 | $q_{(7262-7259)}$ | 7.705 |
| $q_{(7259)}$ | 5.595 | $q_{(7259)}$ | 5.699 |

Figure 7:
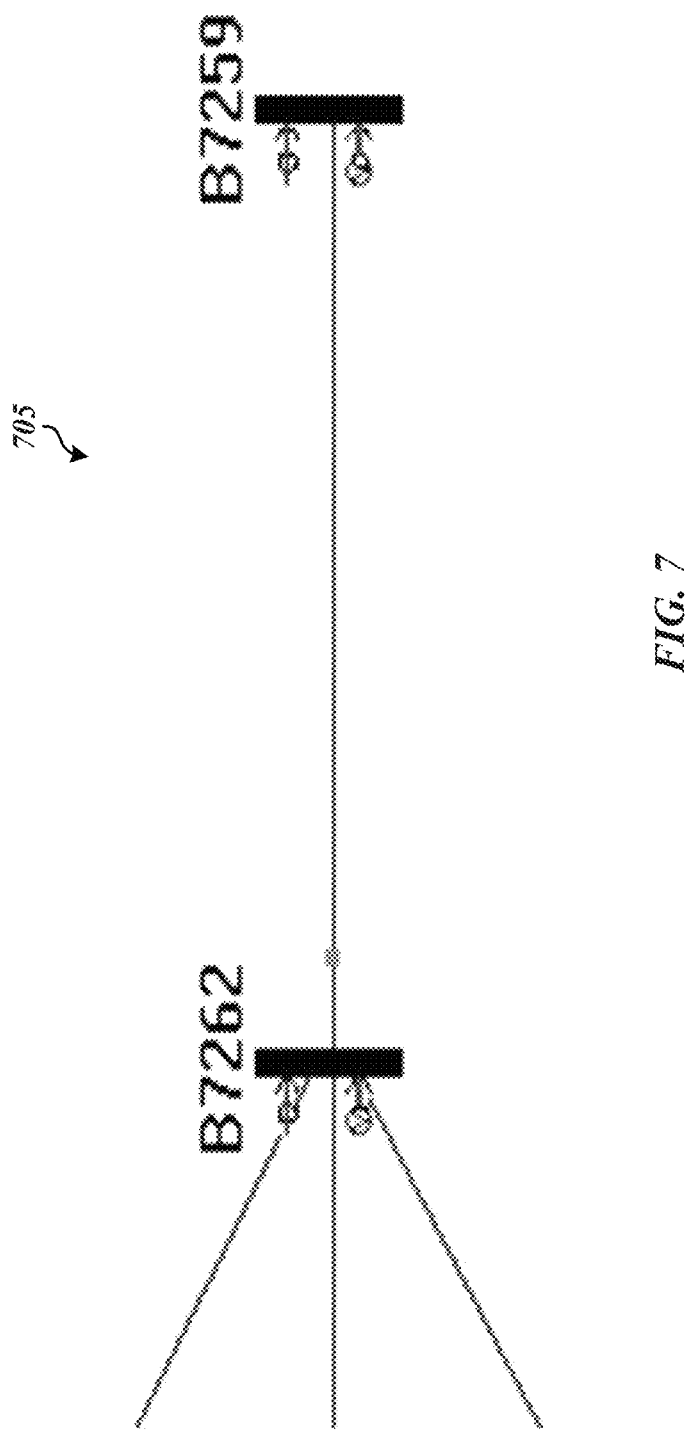
FIG. 7 depicts a portion of a power system according to an embodiment.

In both scenarios, the corresponding normalized variables turn out to be equal, constituting a critical pair. This phenomenon occurs when a bus is connected to the rest of the system by only one transformer, as is shown in power system structure 705 of FIG. 7. The bus voltage magnitude is exclusively controlled by the transformer taps, and these two variables are strongly correlated. Even when there exists sufficient local redundancy, transformer tap errors not be identifiable. Unlike the critical pairs between shunt capacitances and reactive power injections which commonly exist, critical pairs between transformer taps and bus voltage magnitudes occur only under special topologies as shown in FIG. 7.

The results of using one and two scans according to some embodiments for identification when $t_{(7262-7259)}$ is erroneous are shown in the TABLE 2.

TABLE 2

| Single Scan | | Two Scans | |
|---|---|---|---|
| z/p | $r^N/\lambda^N$ | z/p | $r^N/\lambda^N$ |
| $t_{(7262-7259)}$ | 20.68 | $t_{(7262-7259)}$ | 29.10 |
| $v_{(7259)}$ | 20.68 | $r_{(7262-7259)}$ | 28.93 |
| $r_{(7262-7259)}$ | 20.58 | $v_{(7259)}^{(2)}$ | 21.45 |
| $q_{(7262-7259)}$ | 6.955 | $v_{(7259)}^{(1)}$ | 20.68 |
| $q_{(7259)}$ | 5.595 | $s_{(7259)}$ | 7.914 |

It can be seen that in the results using two scans, the normalized Lagrange multiplier corresponding to $t_{(7262-7259)}$ becomes larger than the normalized residual corresponding to $v_{(7259)}$ enabling successful identification of the transformer tap error.

Case Study IV: Sensitivity of Normalized Lagrange Multipliers

The risk of missing bad parameters is another problem found in the 14K-bus system case using conventional methods. Some parameter errors do not have significant impact on their corresponding normalized Lagrange multipliers, i.e., even when gross errors are present in the parameters, the corresponding normalized Lagrange multipliers will remain small, leading to detection failure. Although in most cases normalized Lagrange multipliers are not likely to create false alarms, the probability of missing bad parameters is not negligible.

The issue of missing bad parameters is caused by different sensitivities of normalized Lagrange multipliers to parameter errors. It is observed that when same percentage errors are introduced into different parameters, changes in their corresponding normalized Lagrange multipliers vary widely. Bad parameters will go undetected when the corresponding normalized Lagrange multipliers have low sensitivities.

Typical situations of low sensitivities include parameters with very small values, and parameters of lightly loaded branches. The TABLE 3 gives examples of these two cases, and a general case for comparison.

TABLE 3

| Erroneous Parameters | $p/p_{mean}$ | $x/x_{mean}$ | $\lambda^N$ |
|---|---|---|---|
| $x_{(5255-5256)}$ | 0.30% | 171.5% | 0.3162 |
| $x_{(3399-3553)}$ | 52.42% | 0.19% | 0.1021 |
| $x_{(8589-8590)}$ | 35.94% | 82.09% | 37.37 | where $p/p_{mean}$ stands for the ratio of the real power flow along the specific branch and the average value of branch flows in the entire system, and $x/x_{mean}$ stands for the ratio of the specific parameter value and the average value of the same type of parameters across the entire system. It can be seen that $x_{(5255-5256)}$ belongs to a lightly loaded branch, and $x_{(3399-3553)}$ is a relatively small parameter. In comparison, $x_{(8589-8590)}$ is average in both aspects. When errors with a same percentage of values of the true parameters are introduced, the normalized Lagrange multiplier corresponding to $x_{(8589-8590)}$ grow significantly large to be detected, but those corresponding to $x_{(5255-5256)}$ and $x_{(3399-3553)}$ remain small.

The factors affecting the sensitivity of normalized Lagrange multipliers may include parameter types, parameter values, measurement configuration, network topology and system operating point all contribute to the sensitivity of normalized Lagrange multipliers. In general, it is known that normalized Lagrange multipliers obey standard normal distribution when the parameters do not have gross errors. However, their probability distributions remain unknown.

Figure 8:
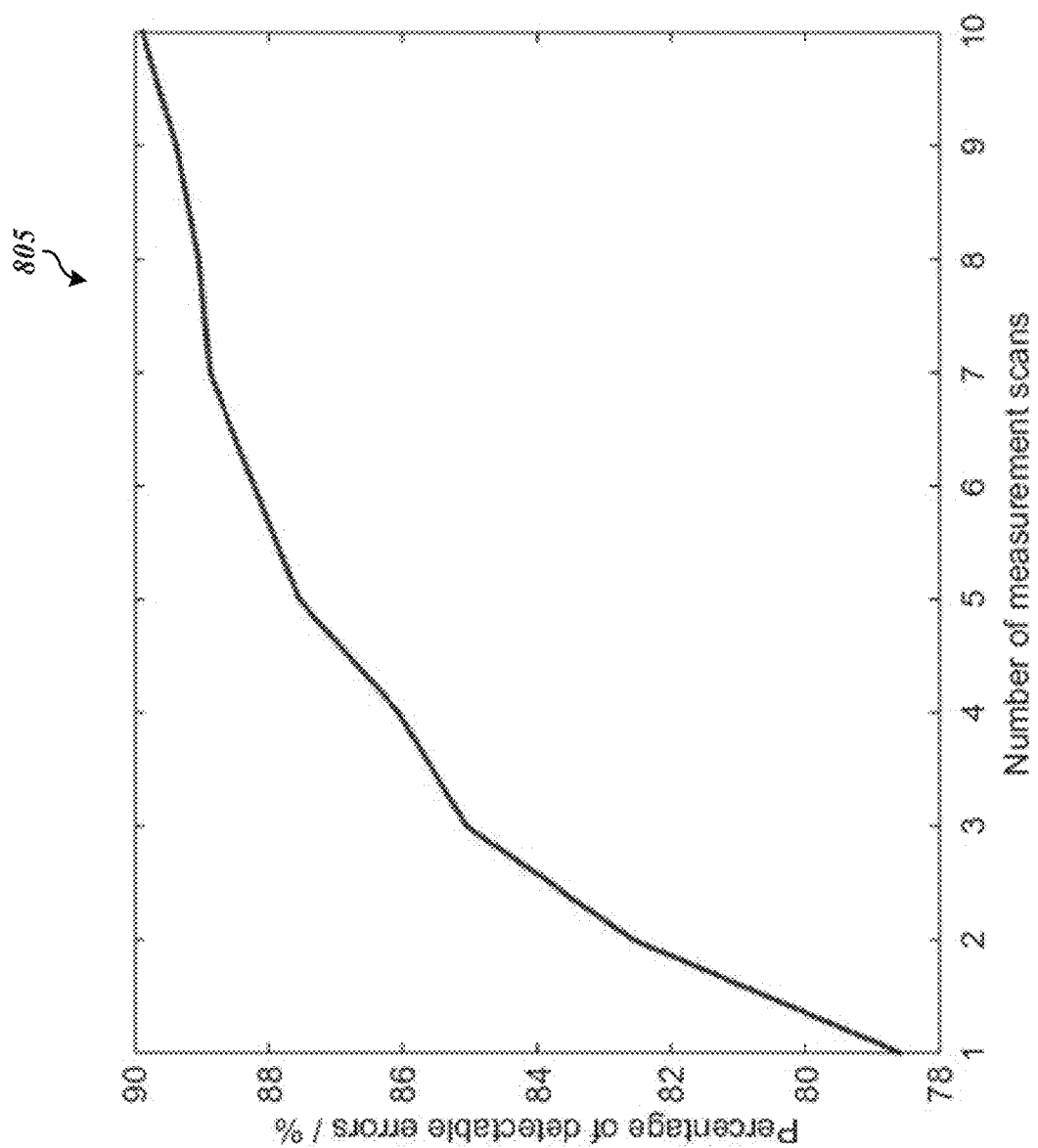
FIG. 8 depicts a graph of percentage of detectable errors versus number of measurement scans according to some embodiments.

Besides identifying certain types of errors, incorporating multiple measurement scans according to some embodiments can also increase the sensitivity of normalized Lagrange multipliers and assist parameter error detection. Monte Carlo simulations were used to test the benefit of increasing the number of scans: random reactance errors were generated in the parameter set, and corresponding normalized Lagrange multipliers are checked against the threshold 3.0. Graph 805 of FIG. 8 shows the percentage of detectable resistance errors with respect to the number of scans. As depicted in FIG. 8, the percentage of detectable errors increases with respect to the number of scans, which further validates the advantages of using processes according to some embodiments as they facilitate the computation of a large number of measurement scans.

A multiple-scan scheme according to some embodiments has multiple advantages over conventional processes. For example, making use of multiple scans is equivalent to increasing the redundancy of measurements, such that the permanent parameter errors that remain constant in different scans can be more easily identified. This advantage also accounts for better performance in resolving critical pair cases of processes according to some embodiments. In a second example, since the operating point varies in different scans, the sensitivities of normalized Lagrange multipliers also vary. Therefore, parameter errors that cannot be identified in one scan may be identified in another scan. For instance, in one scan where the branch with parameter error is lightly loaded, the error may not be detected because it does not bias the estimated states considerably. However, in another scan where the same branch is heavily loaded, the estimated states may be seriously biased by this error, thus the corresponding normalized Lagrange multiplier will become large enough to be detected.

Accordingly, Case Studies I-IV demonstrate that a highly efficient implementation of network parameter error identification method based on normalized Lagrange multipliers is developed by strategically avoiding unnecessary computations. Using processes according to some embodiments, CPU time and required memory can be drastically reduced facilitating the application of the normalized Lagrange multipliers method even for very large utility systems. Since no approximation is involved, the solution remains identical to that of the original method. Case Studies I-IV demonstrate that that a single-scan scheme according to some embodiments is effective in a majority of scenarios, while few special cases exist where error identification may not be possible. However, such cases may be resolved by an alternative multiple-scan scheme according to some embodiments.

Some embodiments may provide state estimation processes using normalized Lagrange multipliers. Such processes may provide, among other things, a systematic way of inspecting parameter errors which does not require the a priori selection of a suspect set of parameters and is capable of differentiating between analog measurement and parameter errors when applied jointly with the other normalized residual tests (for example, as described in A. Abur and A. Gómez-Expósito, Power System State Estimation: *Theory and Implementation*. New York, N.Y., USA: Marcel Dekker, 2004). According to some embodiments, normalized Lagrange multipliers and normalized residuals may be comparable. By choosing the largest normalized value, the erroneous measurement or parameter could be identified. For example, among all normalized variables, the one with the largest absolute value may corresponded to a gross parameter/measurement error. Thus, the misidentification problem between parameter and measurement errors was successfully addressed by state estimation processes according to some embodiments. Some embodiments provide processes for derive the relationships between parameter errors, measurement errors, Lagrange multipliers, and measurement residuals. In various embodiments, state estimation processes may be operative to identify insensitive normalized Lagrange parameters.

Lagrange multipliers associated with parameter errors may be recovered from state estimation results. For example, if a parameter vector in a model is p but the true parameter vector is $p_t$, the parameter vector may be written as the following equation (32):

$$p_e = p - p_t.$$

A measurement vector may be provided as a function of states and parameter errors according to equation (1).

In various embodiments, the WLS state estimation problem may be formulated according to the following equation (33):

$$\min J(x, p_e) = \frac{1}{2} r^T R^{-1} r,$$
$$\text{s.t. } p_e = 0,$$

where R is the covariance matrix of the measurements and r=z−h(x, pe) is the residual vector. Initially, there is no reason to suspect any parameters thus pe is set equal to 0. In various embodiments, the constraint may be eliminated by forming the Lagrangian of equation (33) according to the following equation (34):

$$L(x, p_e, \lambda) = r^T R^{-1} r - \lambda^T p_e,$$

where λ is the Lagrange multiplier vector associated with $p_e$.

The first-order necessary condition for optimality may yield the following equation (35):

$$\frac{\partial L}{\partial p} = H_p^T W R^{-1} + \lambda = 0,$$

where $H_p$ is the Jacobian matrix of measurement function h(x, $p_e$) with respect to network parameters p. When state estimation converges, equation (35) may be satisfied and the Lagrange multiplier vector λ may be recovered according to the following equation (36):

$$\lambda = -H^T R^{-1} r,$$

which may subsequently be used for parameter error identification according to some embodiments. While equation (36) provides the relation between λ and r, it contains no insight with respect to their relations to parameter errors and measurement errors. Accordingly, some embodiments may generate information for relationships between parameter error, measurement error, Lagrange multiplier, and/or measurement residual.

In some embodiments, to derive the relationship between $p_e$, e, λ and r, the erroneous measurement model of equation (1), which contains parameter errors, may be linearized around an operating point according to the following equation (37):

$$\Delta z = H\Delta x' + H_p p_e + e,$$

where $\Delta x'$ is the increment of the erroneous state vector x, H is the measurement Jacobian with respect to the states. The WLS estimate of equation (37) may be determined according to the following equations (38) and (39):

$$\Delta \hat{x}' = G^{-1} H^T R^{-1}(\Delta z - H_p p_e),$$

where $G = H^T R^{-1} H$.

Accordingly, the estimated measurement vector may be written according to the following equation (40):

$$\begin{aligned} \Delta \hat{z}' &= H\Delta \hat{x}' + H_p p_e, \\ &= HG^{-1}H^T R^{-1}\Delta z - HG^{-1}H^T R^{-1}H_p p_e + H_p p_e \\ &= K\Delta z + SH_p p_e. \end{aligned}$$

where $K = HG^{-1}H^T R^{-1}$ (equation (41)) and $S = I - K$ (equation (42)).

In some embodiments, the true linearized measurement model, which is free of parameter errors, may be written as the following equation (43):

$$\Delta z = H\Delta x + e.$$

Substituting equation (43) into equation (4) may yield the following equation (44):

$$\begin{aligned} r &= \Delta z - \Delta \hat{z}', \\ &= \Delta z - K\Delta z - SH_p p_e, \\ &= S(\Delta z - H_p p_e), \\ &= S(H\Delta x + e - H_p p_e), \\ &= Se - SH_p p_e, \\ &= Se + Bp_e, \end{aligned}$$

where $B = -SH_p$ (equation (45)). The second to last step of equation (44) is due to the fact that $S \cdot H = (1-K)H = H - H = 0$.

Equation (44) may provide insight into the relationship between measurement residual and various types of errors, such as measurement errors and parameter errors. In addition, besides the term Se from bad data analysis, there is an extra term $-SH_p p_e$, that may account for the impact of parameter errors on the measurement residual vector r.

Combining equations (35) and (44), the Lagrange multipliers associated with parameter errors may be expressed according to the following equation (47):

$$\begin{aligned} \lambda &= -H_p^T R^{-1} r, \\ &= -H_p^T R^{-1}(Se - SH_p p_e), \\ &= H_p^T R^{-1} SH_p p_e - H_p^T R^{-1} Se, \\ &= \Lambda p_e + Ae \end{aligned}$$

where $A = H_p^T R^{-1} S$ (equation (48)) and $\Lambda = H_p^T R^{-1} SH_p$ (equation (49)).

In general, equation (47) shows the relationship between Lagrange multipliers and measurement errors and parameter errors. In particular, $\Lambda$ is the sensitivity matrix linking $\lambda$ to $p_e$. Similar to measurement residuals, Lagrange multipliers are also linear combinations of the errors. The major difference lies in the fact that $\lambda$ has one-to-one correspondence to $p_e$, whereas r has one-to-one correspondence to e. The sensitivity matrix between $\lambda$ and $p_e$, $\Lambda$, and the sensitivity matrix between r and e, S, are both square matrices. Accordingly, in various embodiments, it may be more efficient to use measurement residuals to analyze measurement errors, and use Lagrange multipliers to analyze parameter errors.

Equation (47) may be derived from linearized measurement model. The accuracy of equation (47), in a true non-linear model, may be determined using Monte Carlo simulations performed in a large utility power system (for instance, a large utility power system in North America which contains more than 14,000 buses). To verify the relationship between Lagrange multipliers and parameter errors may be given by the first term of (17), random parameter errors may be introduced into the network model individually. The estimated value of the Lagrange multiplier corresponding to the introduced error will be given by the following equation (50):

$$\hat{\lambda}_i = \Lambda_{ii} p_{e,i}.$$

Figure 9:
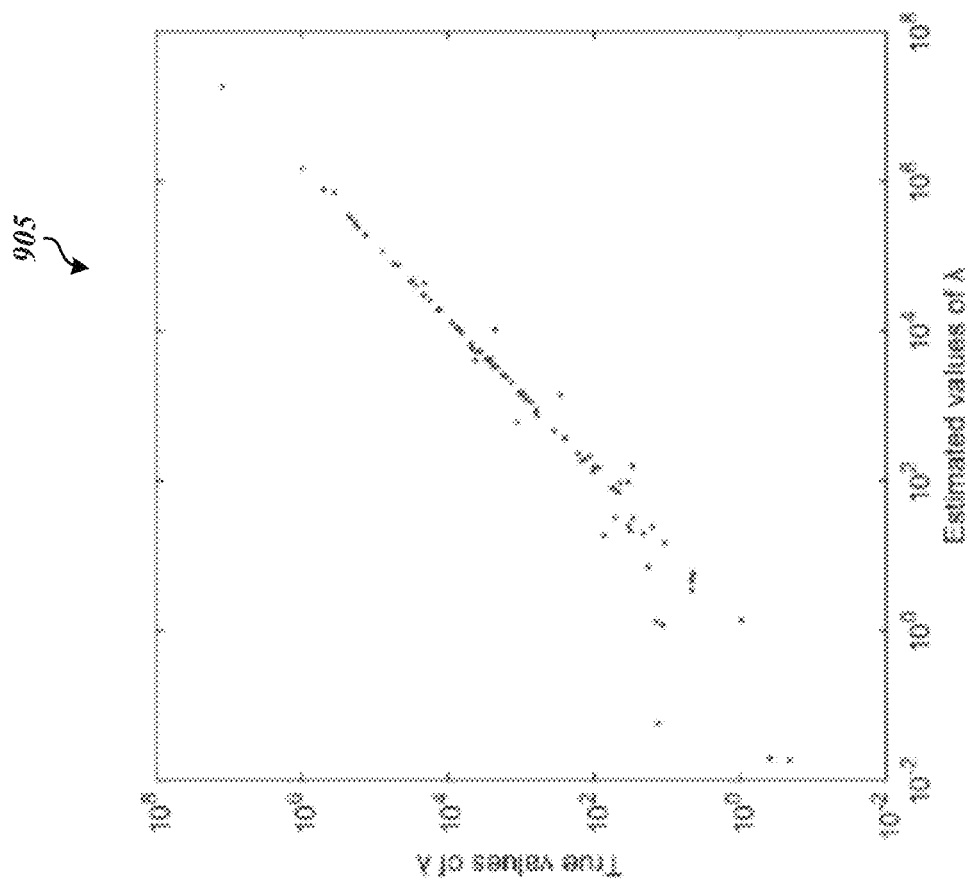
FIG. 9 depicts a graph of true values of $\lambda$ versus estimated values of $\lambda$ according to some embodiments.

A WLS state estimation solution may be obtained followed by the computation of the true value of the Lagrange multiplier vector using equation (e6). FIG. 9 depicts a graph 905 showing the relationship between the estimated value and the true value. It is apparent that the data points are centered around the line passing through the origin with a slope of 1 or substantially 1. Accordingly, even in the presence of Gaussian noise, the values estimated by equation (50) closely match the true values. The points closer to the origin are more widely spread, because when the estimated values are small, the errors caused by the Gaussian noise become more significant. Results in FIG. 8 show that although derived from a linearized model, equation (47) may be used to approximate the relationship between Lagrange multipliers and parameter errors in the true non-linear model. Furthermore, in the presence of significant parameter errors, the first term of equation (47) may be dominant and the second term associated with measurement noise may be ignored.

Some embodiments may provide a normalized Lagrange Multiplier Test according to some embodiments. Unlike analog measurements which commonly carry random noise, network parameters are relatively constant. Therefore, parameter errors can be considered as deterministic variables, and $p_e$ can be considered as a vector whose entries have either zero or nonzero deterministic values. When $p_e = 0$, equation (47) may be reduced to the following equation (51):

$$\lambda = -H_p^T R^{-1} Se.$$

Assuming Gaussian measurement errors, Lagrange multipliers will also obey Gaussian distribution with zero mean, whose covariance matrix may be given by the following equation (52):

$$\begin{aligned} \text{cov}(\lambda) &= E(\lambda \lambda^T), \\ &= E(H_p^T R^{-1} r r^T R^T H_p), \\ &= H_p^T R^{-1} \text{cov}(r) R^{-T} H_p, \end{aligned}$$

-continued $$= H_p^T R^{-1}(SR)R^{-T}H_p,$$

$$= H_p^T R^{-1}SH_p = \Lambda.$$

The third to last stem uses the result cov(r)=SR. The covariance matrix of λ is the sensitivity matrix of λ with respect to $p_e$.

Normalization may be performed according to the following equation (53):

$$\lambda_i^N = \frac{\lambda_i}{\sqrt{\Lambda_{ii}}}.$$

The resulting normalized Lagrange parameters may obey standard normal distribution according to the following equation (54):

$$H_0: \lambda_i^N \sim N(0,1),$$

which is the null hypothesis of the normalized Lagrange multiplier test.

If $p_e \neq 0$, but is deterministic, Lagrange multipliers may obey Gaussian distribution with non-zero mean values according to the following equation (55):

$$E(\lambda) = E(\Lambda p_e) + E(-H_p^T R^{-1} Se) = \Lambda p_e,$$

and the covariance may be given by the following equation (56):

$$\text{cov}(\lambda) = \text{cov}(H_p^T R^{-1} SH_p p_e - H_p^T R^{-1} Se),$$

$$= \text{cov}(H_p^T R^{-1} Se),$$

$$= H_p^T R^{-1}(SR)R^{-T}H_p,$$

$$= H_p^T R^{-1}SH_p = \Lambda.$$

A comparison of equations (52) and (56) may demonstrate that the covariance is independent of parameter errors. If only the ith parameter carries errors, for example, normalizing $\lambda_i$ by equation (53) may provide the following equation (57):

$$H_1: \lambda_i^N \sim N(\sqrt{\Lambda_{ii}} p_{e,i}, 1).$$

Normalized Lagrange multipliers may be checked against a critical value to determine whether the null hypothesis should be accepted. Since the distribution of $H_0$ is symmetric with respect to the vertical axis, a positive threshold t may be chosen and compared against $\lambda_i^N$.

A confidence level, power of the test, and a proof of effectiveness of the normalized Lagrange Multiplier Test according to various embodiments, and the detectability and identifiability of parameter errors according to some embodiments are described in Y. Lin and A. Abur, "A New Framework for Detection and Identification of Network Parameter Errors," I I-EE Transactions on. Smart Grid," Vol. 9, No. 3 (May 2018), which is incorporated by reference as if fully set forth herein.

In some embodiments, a fast error correction process may be provided according to Y. Lin and A. Abur, "Fast Correction of Network Parameter Errors," IEEE Transactions on Power Systems, Vol. 33, No. 1 (January 2018), which is incorporated by reference as if fully set forth herein.

In various embodiments, instead of using measurement residuals (for instance, as described in J. Zhu and A. Abur, "Identification of network parameter errors," IEEE Trans. Power Syst., vol. 21, no. 2, pp. 586-592 (May 2006)), Lagrange multipliers associated with parameter errors in the WLS state estimation problem may be used. Denoting their covariance as Λ, and $H_p = \partial h/\partial p$ (p being the parameter vector), they may be normalized according to equation equation (53), where $\Lambda = H_p^T R^{-1} SH_p$ (see equation (56)). The largest value among all the NLMs and NRs will correspond to an error, under the condition of sufficient redundancy and the absence of very strongly correlated errors. This property leads to the joint identification of parameter and measurement errors.

According to exemplary embodiments, when measurement errors and parameter errors are both considered; the relations between measurement residuals, Lagrange multipliers, measurement errors, and parameter errors, may be given by the following equations (58) and (59):

$$r = Se - SH_p p_e, \text{ and}$$

$$\lambda = \Lambda p_e - H_p^T R^{-1} Se.$$

Comparing r=Se (equation (60)) with equation (58), the presence of a parameter error leads to an additional term in the relationship between r and e. However, for an identified measurement error, the first term still dominates as long as there is no very strongly correlated and substantial parameter error, the following equation (61) may be valid for measurement error correction:

$$z_{corr,i} = z_{bad,i} - r_i/S_{ii}.$$

In some embodiments, equation (59) may reveal the relationship between λ and $P_e$. Similarly, for an identified parameter error, the first term of equation (59) may dominate under similar conditions. According to some embodiments, a fast linear correction scheme for parameter errors may be provided according to the following equation (62):

$$p_{corr,i} = p_{bad,i} - \lambda_i/\Lambda_{ii}.$$

Case Study V

Case Study V: Fast Parameter Error Correction Scheme. A large utility power system containing was used as a test system. TABLE 4 depicts an example where 3 parameter errors and 3 measurement errors are simultaneously introduced into the utility power system, with a redundancy rate of 2.59:

TABLE 4

| 1st cycle | | 2nd cycle | |
|---|---|---|---|
| Identified error | $t_{1289-1285}$ | Identified error | $x_{1898-1935}$ |
| $\lambda^N/r^N$ | 190.8 | $\lambda^N/r^N$ | 97.39 |
| True value | 1.0108 | True value | 0.03704 |
| Erroneous value | 1.0158 | Erroneous value | 0.04704 |
| Estimated value | 1.0108 | Estimated value | 0.03596 |
| Estimation error | <0.01% | Estimation error | 2.92% |
| 3rd cycle | | 4th cycle | |
| Identified error | $v_{467}$ | Identified error | $p_{2886}$ |
| $\lambda^N/r^N$ | 49.99 | $\lambda^N/r^N$ | 26.35 |
| True value | 1.0304 | True value | −0.04305 |
| Erroneous value | 0.9704 | Erroneous value | 0.00695 |
| Estimated value | 1.0304 | Estimated value | −0.04267 |
| Estimation error | <0.01% | Estimation error | 0.88% |

TABLE 4-continued

| 5th cycle | | 6th cycle | |
|---|---|---|---|
| Identified error | $r_{2840-2886}$ | Identified error | $q_{287-1285}$ |
| $\lambda^N/r^N$ | 26.29 | $\lambda^N/r^N$ | 19.61 |
| True value | 0.01980 | True value | 0.01457 |
| Erroneous value | 0.02480 | Erroneous value | 0.03457 |
| Estimated value | 0.01955 | Estimated value | 0.01441 |
| Estimation error | 1.26% | Estimation error | 1.10% |

| 7th cycle | | 8th cycle | |
|---|---|---|---|
| Identified error | $x_{1898-1935}$ | Identified error | None |
| $\lambda^N/r^N$ | 11.80 | $\lambda^N/r^N$ | — |
| True value | 0.03704 | True value | — |
| Erroneous value | 0.03596 | Erroneous value | — |
| Estimated value | 0.03700 | Estimated value | — |
| Estimation error | 0.11% | Estimation error | — |

Denoting resistance, reactance, tap ratio, real power, reactive power, and voltage magnitude as r, x, t, p, q, and v, respectively, the introduced errors include $r_{2840-2886}$, $x_{1898-1935}$, $t_{1289-1285}$, $p_{2886}$, $q_{287-1285}$, and $v_{467}$. Among these errors, there were two strongly correlated pairs: ($r_{2840-2886}$, $p_{2886}$) and ($t_{1289-1285}$, $q_{287-1285}$), since the errors in each pair are electrically adjacent to each other. In addition, the entire measurement set was intentionally corrupted by Gaussian noise. The standard deviation of the noise was 0.001 p.u., and the weights of all measurements were set at 1/0.0012=106 accordingly. A NLM test according to equation (53) and the following equation (63) were jointly applied to identify both measurement and parameter errors:

$$r_i^N = \frac{r_i}{\sqrt{\Omega(i, i)}}.$$

Equations (61) and (62) were used to correct the identified measurements and parameter errors in each cycle, respectively. The results of Case Study V verify that the parameter error correction process according to some embodiments works very well, including in the presence of strongly correlated errors and Gaussian noise. The parameter error correction process according to some embodiments does not degrade the performance of the NLM/NR tests and the measurement error correction scheme of equation (61), and produces reliable results itself.

Figure 10:
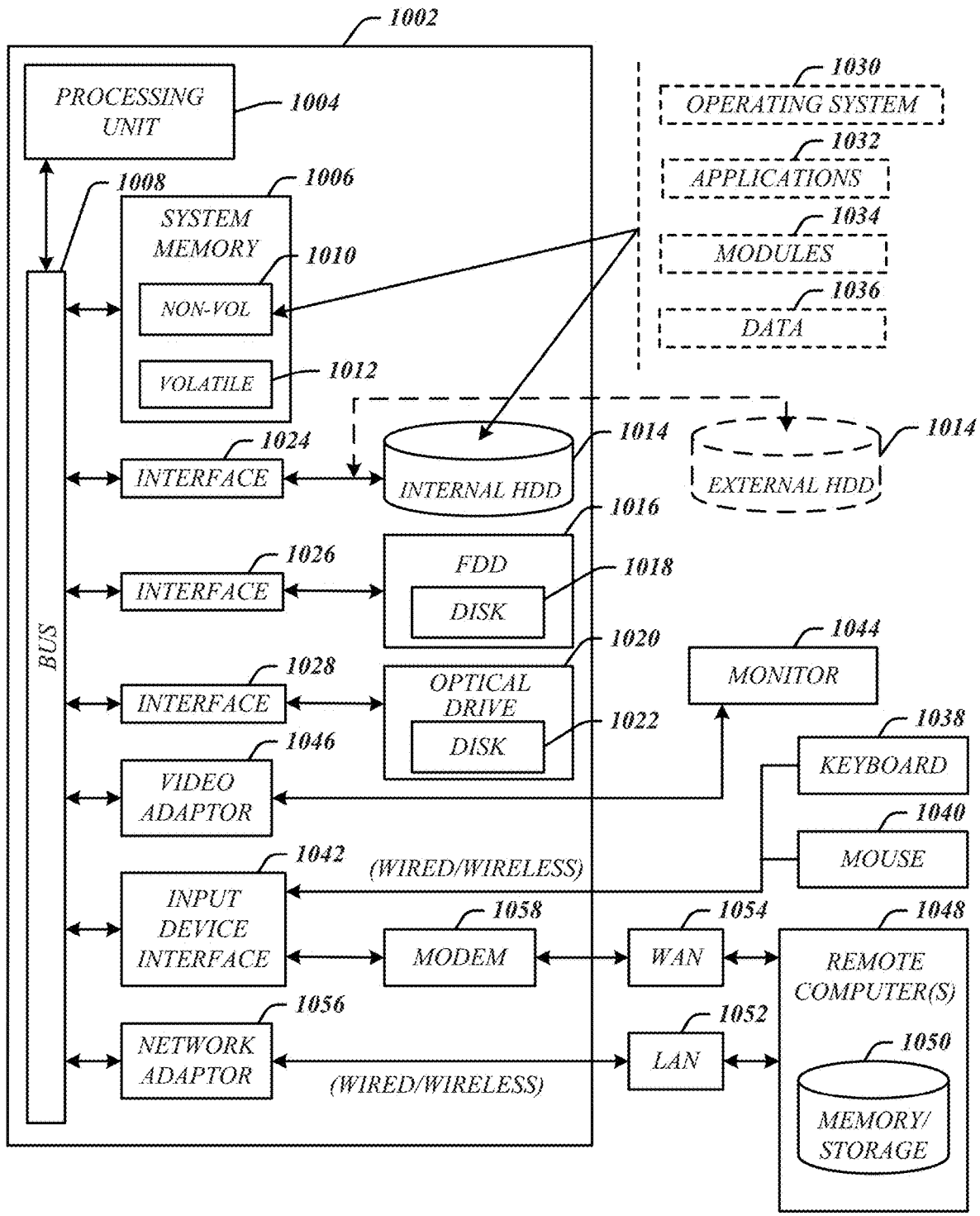
FIG. 10 illustrates an embodiment of a computing architecture.

FIG. 10 illustrates an embodiment of an exemplary computing architecture 1000 suitable for implementing various embodiments as previously described. In various embodiments, the computing architecture 1000 may comprise or be implemented as part of an electronic device. In some embodiments, the computing architecture 1000 may be representative, for example, of computing device 105. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1022, respectively. The HDD interface 1024 for external drive implementations can include at least one or both of Universal Serial Bus (USB) and IEEE 13104 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of computing device 105.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1384 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
    at least one memory; and
    logic coupled to the at least one memory, the logic to:
        determine a state estimation solution for a scan q of a plurality of buses of an electrical power system, the electrical power system comprising one of an electrical utility power system or an industrial power system,
        determine a plurality of Lagrange multipliers for the scan q based on the state estimation,
        determine a necessary subset $(\Omega'_{nec}{}^{(q)})$ of non-zero terms of a covariance matrix of a measurement residual vector associated with the Lagrange multipliers,
        determine a necessary subset of an inverse gain matrix $([G^{(q)}]^{-1})_{nec}$ based on the necessary subset $\Omega'_{nec}{}^{(q)}$, and
        determine test values of a covariance of a normalized set of the Lagrange multipliers based on the necessary subset $\Omega'_{nec}{}^{(q)}$ and calculating only non-zero terms of the inverse gain matrix $([G^{(q)}]^{-1})_{nec}$,
        compare the test values to a threshold to determine at least one gross error in a plurality of parameters of the electrical power system, and
        modify operation of at least one component of the electrical power system based on the at least one gross error.

2. The apparatus of claim 1, the electrical power system comprising greater than 500 buses.

3. The apparatus of claim 1, the electrical power system comprising at least 14,000 buses.

4. The apparatus of claim 1, the necessary subset $\Omega'_{nec}{}^{(q)}$ is determined according to the following:

$$\Omega'_{nec}{}^{(q)} = \{\Omega'_{nec}{}^{(q)}(k,l) | H_p{}^{(q)}(i,l) \neq 0; H_p{}^{(q)}(i,k) \neq 0; i=1,2,\ldots,u\},$$

where $H_p$ is a measurement Jacobian with respect to a parameter vector p associated with the state estimation.

5. The apparatus of claim 1, the necessary subset of the inverse gain matrix $([G^{(q)}]^{-1})_{nec}$ is determined according to the following:

$$([G^{(q)}]^{-1})_{nec} = \left\{ G^{(q)}{}^{-1}(k,l) \middle| \begin{array}{l} H^{(q)}(i,l) \neq 0; H^{(q)}(j,k) \neq 0 \\ \Omega'^{(q)}(i,j) \in \Omega'^{(q)}_{nec} \end{array} \right\}.$$

6. The apparatus of claim 1, a number of necessary entries per parameter in the inverse gain matrix $[G^{(q)}]^{-1}$ is independent of a size of the electrical power system.

7. A computer-implemented method, comprising, by a processor of a computing device communicatively coupled to an electrical power system:
    determining a state estimation solution for a scan q of the electrical power system, the electrical power system comprising one of an electrical utility power system or an industrial power system;
    determining a plurality of Lagrange multipliers for the scan q based on the state estimation;
    determining a necessary subset $(\Omega'_{nec}{}^{(q)})$ of non-zero terms of a covariance matrix of a measurement residual vector associated with the Lagrange multipliers;
    determining a necessary subset of an inverse gain matrix $([G^{(q)}]^{-1})_{nec}$ based on the necessary subset $\Omega'_{nec}{}^{(q)}$;
    determining test values of a covariance of a normalized set of the Lagrange multipliers based on the necessary subset $\Omega'_{nec}{}^{(q)}$ and calculating only non-zero terms of the inverse gain matrix $([G^{(q)}]^{-1})_{nec}$;
    comparing the test values to a threshold to determine at least one gross error in a plurality of parameters of the electrical power system; and
    modify operation of at least one component of the electrical power system based on the at least one gross error.

8. The computer-implemented method of claim 7, the electrical power system comprising greater than 500 buses.

9. The computer-implemented method of claim 7, the electrical power system comprising at least 14,000 buses.

10. The computer-implemented method of claim 7, the necessary subset $\Omega'_{nec}{}^{(q)}$ is determined according to the following:

$$\Omega'_{nec}{}^{(q)} = \{\Omega'_{nec}{}^{(q)}(k,l) | H_p{}^{(q)}(i,l) \neq 0; H_p{}^{(q)}(i,k) \neq 0; i=1,2,\ldots,u\},$$

where $H_p$ is a measurement Jacobian with respect to a parameter vector p associated with the state estimation.

11. The computer-implemented method of claim 7, the necessary subset of the inverse gain matrix $([G^{(q)}]^{-1})_{nec}$ is determined according to the following:

$$([G^{(q)}]^{-1})_{nec} = \left\{ G^{(q)}{}^{-1}(k,l) \middle| \begin{array}{l} H^{(q)}(i,l) \neq 0; H^{(q)}(j,k) \neq 0 \\ \Omega'^{(q)}(i,j) \in \Omega'^{(q)}_{nec} \end{array} \right\}.$$

12. The computer-implemented method of claim 7, a number of necessary entries per parameter in the inverse gain matrix $[G^{(q)}]^{-1}$ is independent of a size of the electrical power system.

13. A non-transitory computer-readable storage medium that stores computer-executable instructions for execution by processing circuitry of a computing device communicatively coupled to an electrical power system, the computer-executable instructions, when executed, to cause the computing device to:

determine a state estimation solution for a scan q of the electrical power system, the electrical power system comprising one of an electrical utility power system or an industrial power system;

determine a plurality of Lagrange multipliers for the scan q based on the state estimation;

determine a necessary subset ($\Omega'^{(q)}_{nec}$) of non-zero terms of a covariance matrix of a measurement residual vector associated with the Lagrange multipliers;

determine a necessary subset of an inverse gain matrix ($[G^{(q)}]^{-1})_{nec}$ based on the necessary subset $\Omega'^{(q)}_{nec}$;

determine test values of a covariance of a normalized set of the Lagrange multipliers based on the necessary subset $\Omega'^{(q)}_{nec}$ and calculating only non-zero terms of the inverse gain matrix $([G^{(q)}]^1)_{nec}$;

compare the test values to a threshold to determine at least one gross error in a plurality of parameters of the electrical power system; and modify operation of at least one component of the electrical power system based on the at least one gross error.

14. The non-transitory computer-readable storage medium of claim 13, the electrical power system comprising greater than 500 buses.

15. The non-transitory computer-readable storage medium of claim 13, the electrical power system comprising at least 14,000 buses.

16. The non-transitory computer-readable storage medium of claim 13, the necessary subset $\Omega'^{(q)}_{nec}$ is determined according to the following:

$$\Omega'^{(q)}_{nec} = \{\Omega'^{(q)}_{nec}(k,l) | H_p^{(q)}(i,l) \neq 0; H_p^{(q)}(i,k) \neq 0; i=1,2,\ldots,u\},$$

where $H_p$ is a measurement Jacobian with respect to a parameter vector p associated with the state estimation.

17. The non-transitory computer-readable storage medium of claim 13, the necessary subset of the inverse gain matrix $([G^{(q)}]^{-1})_{nec}$ is determined according to the following:

$$([G^{(q)}]^{-1})_{nec} = \left\{ [G^{(q)}]^{-1}(k,l) \middle| \begin{array}{l} H^{(q)}(i,l) \neq 0; H^{(q)}(j,k) \neq 0 \\ \Omega'^{(q)}(i,j) \in \Omega'^{(q)}_{nec} \end{array} \right\}.$$

18. The non-transitory computer-readable storage medium of claim 13, a number of necessary entries per parameter in the inverse gain matrix $[G^{(q)}]^{-1}$ is independent of a size of the electrical power system.

* * * * *